US012687659B2

(12) United States Patent (10) Patent No.: US 12,687,659 B2
Itamoto (45) Date of Patent: Jul. 21, 2026

(54) ANTIREFLECTION SUBSTRATE

(71) Applicant: FUKUVI CHEMICAL INDUSTRY CO., LTD., Fukui (JP)

(72) Inventor: Teppei Itamoto, Fukui (JP)

(73) Assignee: FUKUVI CHEMICAL INDUSTRY CO., LTD., Fukui (JP)

( * ) Notice: Subject to any disclaimer, the term of this patent is extended or adjusted under 35 U.S.C. 154(b) by 586 days.

(21) Appl. No.: 18/271,713

(22) PCT Filed: Dec. 23, 2021

(86) PCT No.: PCT/JP2021/047872

§ 371 (c)(1),
(2) Date: Jul. 11, 2023

(87) PCT Pub. No.: WO2022/153825

PCT Pub. Date: Jul. 21, 2022

(65) Prior Publication Data

US 2024/0052121 A1 Feb. 15, 2024

(30) Foreign Application Priority Data

Jan. 18, 2021 (JP) .............................. JP2021-005663

(51) Int. Cl.
| | |
|---|---|
| G02B 1/111 | (2015.01) |
| C08J 7/04 | (2020.01) |
| C09D 7/61 | (2018.01) |
| C09D 175/16 | (2006.01) |
| G02B 1/14 | (2015.01) |

(52) U.S. Cl.
CPC .............. *G02B 1/111* (2013.01); *C08J 7/0423* (2020.01); *C09D 7/61* (2018.01); *C09D 175/16* (2013.01); *G02B 1/14* (2015.01); *C08J 2375/16* (2013.01)

(58) Field of Classification Search
CPC ......... G02B 1/11; G02B 1/111; C09D 175/16; C08J 7/0423; C08J 2375/16
See application file for complete search history.

(56) References Cited

U.S. PATENT DOCUMENTS

| | | | |
|---|---|---|---|
| 9,149,962 B2 | 10/2015 | Saito et al. | |
| 10,253,205 B2 | 4/2019 | Tsukamoto | |
| 2014/0248478 A1 | 9/2014 | Saito et al. | |
| 2019/0324173 A1 | 10/2019 | Saito et al. | |
| 2021/0103073 A1 | 4/2021 | Saito et al. | |

FOREIGN PATENT DOCUMENTS

| | | | | |
|---|---|---|---|---|
| JP | 2006-231900 | 9/2006 | | |
| JP | 2007-256651 | 10/2007 | | |
| JP | 2009-222801 | 10/2009 | | |
| JP | 2014-208743 | 11/2014 | | |
| JP | 5745639 | 7/2015 | | |
| JP | 2016-20049 | 2/2016 | | |
| JP | 2016-71307 | 5/2016 | | |
| JP | 7389765 B2 * | 11/2023 | ............. | G02B 1/111 |
| WO | 2013/061428 | 5/2013 | | |
| WO | 2013/153648 | 10/2013 | | |
| WO | 2018/117018 | 6/2018 | | |
| WO | 2019/202942 | 10/2019 | | |

OTHER PUBLICATIONS

International Search Report (ISR) issued Mar. 8, 2022 in International (PCT) Application No. PCT/P2021/047872.

* cited by examiner

*Primary Examiner* — Sophie Hon
(74) *Attorney, Agent, or Firm* — Wenderoth, Lind & Ponack, L.L.P.

(57) ABSTRACT

An antireflection substrate includes a resin substrate, and an underlying layer, a hard coat layer, an antireflection layer, and a cover layer which are provided on the resin substrate in this order. The underlying layer is formed of a cured material of a hexafunctional or higher functional urethane (meth)acrylate compound (A1), the hard coat layer contains a cured material of a urethane (meth)acrylate compound (A) containing a trifunctional or less functional urethane (meth) acrylate compound (A2), the antireflection layer includes an intermediate refractive index layer having a refractive index of 1.50 to 1.75, a high refractive index layer having a refractive index of 1.60 to 2.00, and a low refractive index layer having a refractive index of 1.25 to 1.40 in this order from the hard coat layer side, the refractive index of the high refractive index layer being higher than that of the intermediate refractive index layer, and the intermediate refractive index layer, the high refractive index layer, and the low refractive index layer all containing a cured material of an organic/inorganic composite compound (B), and the cover layer includes a cured material of an organic/inorganic composite compound (B). The antireflection substrate having high antireflection performance and excellent elongation characteristics is suitable as a film for film insert molding.

4 Claims, No Drawings

ANTIREFLECTION SUBSTRATE

TECHNICAL FIELD

The present invention relates to an antireflection substrate having excellent elongation characteristics and antireflection performance. More specifically, the present invention relates to an antireflection substrate that is suitably used as an antireflection film for film insert molding which is provided with an antireflection layer.

BACKGROUND ART

In the related art, various display devices, such as personal computers, mobile phones, liquid crystal monitors, and automatic teller machines, have a problem of preventing reflection and glare under natural and artificial light to prevent deterioration of visibility, and various countermeasures have been taken.

As one of the countermeasures, an antireflection film has been developed, and the purpose thereof has been achieved by attaching the film to the surface of a display device. On the other hand, an integrally molded product with an anti-reflection layer on the surface thereof has also been developed.

A film insert molding method is one of methods of manufacturing an integrally molded product with an antireflection layer. The method is a molding method using a separately prepared film having an antireflection function (antireflection film). In the method, after the antireflection film is set in an injection molding machine, the antireflection film is formed into a predetermined shape while applying heat thereto, and a predetermined resin is then injected and solidified to integrate the antireflection film and the resin by heat welding. The film insert molding method has an advantage of being highly adaptable to complex shapes and being applicable to deep-drawn products, and has been used to manufacture, for example, transparent covers of automobile instrument panels.

The film insert molding method is a method that is applicable to the manufacture of complex molded products as described above. On the other hand, in the case of a molded product that has corners and curves, an antireflection film of the related art has a problem that a crack occurs at a corner or a curve on which bending stress and tensile stress are concentrated when the antireflection film is formed into a predetermined shape while applying heat thereto, resulting in defective insert molding (PTL 1 to 3).

The inventors have previously proposed a transparent resin substrate that is suitable as an antireflection film with high elongation characteristics which is used in film insert molding (PTL 4).

CITATION LIST

Patent Literature

PTL 1: Japanese Patent No. 5745639
PTL 2: Japanese Patent Application Publication No. 2016-20049
PTL 3: Japanese Patent Application Publication No. 2014-208743
PTL 4: WO 2018/117018

SUMMARY OF INVENTION

Technical Problem

A transparent resin substrate proposed by the inventors is characterized in that a low refractive index layer constituting an antireflection layer does not contain silica particles in order to secure excellent elongation characteristics. As a result, a refractive index of the low refractive index layer is not sufficiently reduced, sacrificing antireflection performance. In addition, when the antireflection layer has a three-layered structure including a high refractive index layer, it is difficult to set a condition for manufacturing an antireflection substrate with excellent elongation characteristics and to constantly achieve stable mass production.

As a result of intensive studies on components of each refractive index layer that constitutes an antireflection layer, the inventors have found that if an alkoxysilane-modified resin compound (organic/inorganic composite compound) that functions as a binder is used in each refractive index layer, a low refractive index layer can thus contain silica particles to achieve a low refractive index, and an antireflection layer with excellent elongation characteristics can be stably formed.

As a result, it is possible to stably mass-produce antireflection substrates that can prevent cracks in an antireflection layer and a hard coat layer, which are likely to occur during film insert molding, and peeling-off at interfaces between layers, and the present invention has been completed.

Solution to Problem

That is, according to the present invention, there is provided an antireflection substrate including a resin substrate, and an underlying layer, a hard coat layer, an antireflection layer, and a cover layer which are provided on the resin substrate in this order, in which the underlying layer is formed of a cured material of a hexafunctional or higher functional urethane (meth)acrylate compound (A1), the hard coat layer contains a cured material of a urethane (meth)acrylate compound (A) containing a trifunctional or less functional urethane (meth)acrylate compound (A2), the antireflection layer includes an intermediate refractive index layer having a refractive index of 1.50 to 1.75, a high refractive index layer having a refractive index of 1.60 to 2.00, and a low refractive index layer having a refractive index of 1.25 to 1.40 in this order from the hard coat layer side, the refractive index of the high refractive index layer being higher than that of the intermediate refractive index layer, and the intermediate refractive index layer, the high refractive index layer, and the low refractive index layer all containing a cured material of an organic/inorganic composite compound (B), and the cover layer includes a cured material of an organic/inorganic composite compound (B).

In the invention of the antireflection substrate, it is preferable that 1) the hard coat layer be formed of a cured material of a composition containing 30 to 80 parts by mass of spherical silica particles (C-1), 5 to 15 parts by mass of a silane coupling agent (D), and 0.1 to 1.5 parts by mass of a metal chelate compound (E) with respect to 100 parts by mass of a urethane (meth)acrylate compound (A) containing 60% by mass or more of a trifunctional or less functional urethane (meth)acrylate compound (A2), 2) the intermediate refractive index layer be formed of a cured material of a composition containing 50 to 170 parts by mass of metal oxide particles (F), 50 to 100 parts by mass of a silane coupling agent (D), and 1 to 10 parts by mass of a metal chelate compound (E) with respect to 100 parts by mass of an organic/inorganic composite compound (B),

3

3) the high refractive index layer be formed of a cured material of a composition containing 500 to 1500 parts by mass of metal oxide particles (F), 100 to 300 parts by mass of a silane coupling agent (D), and 10 to 30 parts by mass of a metal chelate compound (E) with respect to 100 parts by mass of an organic/inorganic composite compound (B), 4) the low refractive index layer be formed of a cured material of a composition containing 100 to 300 parts by mass of hollow silica particles (C-2), 20 to 150 parts by mass of a silane coupling agent (D), and 1 to 10 parts by mass of a metal chelate compound (E) with respect to 100 parts by mass of an organic/inorganic composite compound (B), 5) the cover layer be formed of a cured material of a composition containing 10 to 80 parts by mass of a silane coupling agent (D) and 1 to 10 parts by mass of a metal chelate compound (E) with respect to 100 parts by mass of an organic/inorganic composite compound (B), 6) the antireflection substrate has an elongation percentage of 120% to 160%, 7) the underlying layer have a thickness of 20 nm to 150 nm, the hard coat layer have a thickness of 1 μm to 5 μm, the intermediate refractive index layer have a thickness of 50 nm to 200 nm, the high refractive index layer have a thickness of 50 nm to 200 nm, the low refractive index layer have a thickness of 50 nm to 200 nm, and the cover layer has a thickness of 10 nm to 20 nm, and 8) the organic/inorganic composite compound (B) be a composite compound having a structure in which an alkoxysilyl group is bonded to any of a bisphenol A-type epoxy resin, a novolac phenol resin, and polyamic acid.

In particular, it is preferable that the antireflection substrate be configured such that the hard coat layer, the refractive index layers, and the cover layer are formed of the cured materials described in 1) to 5) above, and satisfy having the elongation percentage described in 6) above. It is further preferable that the antireflection substrate be configured such that the underlying layer, the hard coat layer, the refractive index layers, and the cover layer satisfy having the thicknesses of the respective layers described in 7) above, and the refractive index layers and the cover layer contain the cured materials of the compounds described in 8) above.

The present invention also provides an antireflection film for film insert molding including the above-described antireflection substrate.

Advantageous Effects of Invention

In an antireflection substrate of the present invention, an underlying layer, a hard coat layer, an antireflection layer, and a cover layer having specific compositions are provided in this order on a resin substrate. In particular, the antireflection layer is constituted by three types of refractive index layers with different refractive indices, and a compound with a special chemical structure is used as a binder for each refractive index layer as well as the cover layer.

Due to these characteristics, an elongation percentage of the antireflection substrate is high, and for example, an elongation percentage of 120% to 160% can be realized. As a result, upper layers of the resin substrate can easily follow the deformation of the resin substrate during firm formation in film insert molding, and it is possible to effectively prevent the occurrence of cracks and breakages in the hard coat layer and the antireflection layer and peeling-off at interfaces between layers.

In addition, since the antireflection layer is constituted by three types of refractive index layers with different refractive indices, and a low refractive index layer can contain silica particles, antireflection performance is thereby significantly improved.

Furthermore, the above-described antireflection substrate having excellent characteristics can be stably manufactured without being affected by manufacturing conditions such as preparation conditions, coating conditions, and curing conditions of coating compositions for forming each layer. As a result, it is possible to reduce the manufacture of defective molded products caused by the occurrence of a crack originating from the antireflection substrate during film insert molding and to achieve high productivity by avoiding a decrease in yield, and its industrial value is high.

Further, the antireflection substrate has excellent chemical resistance, and it is possible to prevent discoloration and peeling-off of the antireflection layer during washing with chemicals and detergents, and deterioration and appearance defects due to swelling of a resin substrate, or the like.

The antireflection substrate is useful for industrial production of transparent moldings with antireflection functions, such as transparent front panels of various displays and transparent covers for automobile instrument panels, by a film insert molding method.

DESCRIPTION OF EMBODIMENTS

<Antireflection Substrate>

An antireflection substrate of the present invention has a basic structure in which an underlying layer, a hard coat layer, an antireflection layer, and a cover layer are laminated in order on the surface of a resin substrate being a base material.

The antireflection layer is constituted by three types of layers with different refractive indices, that is, an intermediate refractive index layer, a high refractive index layer, and a low refractive index layer, in order from the hard coat layer side.

The cover layer is provided on the antireflection layer.

The antireflection substrate has excellent elongation characteristics, and it is possible to stably obtain an antireflection substrate having an elongation percentage of 120% to 160% as measured by a measurement method to be described later.

<Resin Substrate>

A resin substrate having light transmittance is suitable according to its intended purpose of use, and for example, a thermoplastic resin substrate having a total light transmittance of 85% or more at a wavelength of 750 nm to 400 nm is preferable.

Such transmissive thermoplastic resins include acrylic resins represented by polymethyl methacrylate, polycarbonate resins, polyethylene terephthalate resins, polyaryldiglycol carbonate resins, polystyrene resins, and the like.

The resin substrate may be a laminated resin substrate in which two types of resins described above are laminated, but it is preferable that a surface on a side where the underlying layer is formed be formed of an acrylic resin, a polycarbonate resin, or a polyethylene terephthalate resin. A laminated resin substrate of a polycarbonate resin and an acrylic resin is suitably used.

In addition, such a resin substrate may be colored with an oil-soluble dye or the like as long as its light transmittance is not impaired.

The surface of such a resin substrate may be surface-treated with a primer known per se for the purpose of improving adhesion to the hard coat layer.

The thickness of the resin substrate varies depending on the shape and size of a molded product that is finally molded by film insert molding. In general, it is preferable that the resin substrate be moderately thin and have a thickness of, for example, 30 μm to 1000 μm.

When the thickness is excessively large, the amount of resin that can be injected into a molding die may be limited during film insert molding, and there is a concern that it may be difficult to obtain a molding with a desired shape. When the thickness is excessively small, the formability of the antireflection substrate is impaired, and defective molding such as breakage is likely to occur during film insert molding.

<Underlying Layer>

The underlying layer is a layer necessary to secure a predetermined elongation percentage of the antireflection substrate and to prevent chemicals permeating from the surface of an antireflection transparent molding, which is a final molded product, from reaching the resin substrate and whitening or swelling the resin substrate when the surface of the antireflection transparent molding is treated with the chemicals, and the underlying layer is formed of a cured material of a hexafunctional or higher functional urethane (meth)acrylate compound (A1).

The thickness of the underlying layer is generally 20 nm to 150 nm. When the thickness is less than 20 nm, the function of the underlying layer cannot be exhibited, and when the thickness exceeds 150 nm, the elongation percentage of the obtained antireflection substrate decreases, resulting in poor formability. The thickness is preferably 50 nm to 130 nm, particularly preferably 60 nm to 90 nm.

[Hexafunctional or Higher Functional Urethane (Meth) Acrylate Compound (A1)]

In order to achieve the above-described purpose, the underlying layer needs to be formed of a cured material of a hexafunctional or higher functional urethane (meth)acrylate compound (A1) (hereinafter, referred to as 6-urethane (meth)acrylate; A1). The cured material of 6-urethane (meth)acrylate (A1) has a high crosslink density and high hardness, but has moderate flexibility.

In the case of a cured material of a normal (meth)acrylate compound that does not have urethane bonds in a molecule even when the cured material is a hexafunctional or higher functional (meth)acrylate compound, the cured material is excessively hard to secure a predetermined elongation percentage. Even when the cured material is a urethane (meth) acrylate compound, a pentafunctional or less functional urethane (meth)acrylate compound is inferior in chemical resistance and is not sufficient in terms of protection of a resin substrate.

The 6-urethane (meth)acrylate (A1) is a urethane (meth) acrylate compound obtained by addition reaction of a terminal isocyanate compound, which is obtained by reacting a polyol compound and a diisocyanate compound, and a (meth)acrylate compound having a plurality of hydroxyl groups, and can be obtained by reacting these two raw materials by a method known per se at a quantitative ratio at which a (meth)acryloyl group is 6 molar times or more. For example, pentaerythritol tri(meth)acrylate can be reacted with both terminal isocyanate (for example, trihexadiethylene diisocyanate) to obtain a 6-urethane (meth)acrylate (A1) having three (meth)acryloyl groups at each of the terminals of the molecular chain.

Examples of a polyol compound include a polyester polyol compound, a polyether polyol compound, a polycarbonate diol compound, and the like. Examples of a diisocyanate compound include aromatic diisocyanates such as tolylene diisocyanate and diphenylmethane diisocyanate, and aliphatic diisocyanates such as 1,6-hexamethylene diisocyanate and 1,3-bis(isocyanatomethyl)cyclohexane.

Examples of a (meth)acrylate compound used as one raw material include trimethylolpropane (meth)acrylate, pentaerythritol (meth)acrylate, and dipentaerythritol (meth) acrylate.

Specific examples of 6-urethane (meth)acrylate (A1) include dipentaerythritol hexa(meth)acrylate, phenyl glycidyl ether (meth)acrylate hexamethylene diisocyanate urethane prepolymer, phenyl glycidyl ether (meth)acrylate isophorone diisocyanate urethane prepolymer, phenyl glycidyl ether (meth)acrylate tolylene diisocyanate urethane prepolymer, glycerin di(meth)acrylate tolylene diisocyanate urethane oligomer, pentaerythritol tri(meth)acrylate hexamethylene diisocyanate urethane oligomer, glycerin di(meth) acrylate isophorone diisocyanate urethane oligomer, pentaerythritol tri(meth)acrylate tolylene diisocyanate urethane oligomer, pentaerythritol tri(meth)acrylate isophorone diisocyanate urethane pre-oligomer, and the like. These may be used alone or in combination of two or more.

Note that these 6-urethane (meth)acrylates (A1) are commercially available as, for example, Art Resin Series (Negami Kogyo Co., Ltd.), U/UA Oligo Series (Shin-Nakamura Chemical Co., Ltd.), Shikou UV Series (Nippon Synthetic Chemical Co., Ltd.), Urethane Acrylate UA Series (Kyoeisha Chemical Co., Ltd.), and the like and are commercially available and can be generally obtained.

A plurality of 6-urethane (meth)acrylate (A1) may be used in combination from the viewpoint of viscosity adjustment for facilitating coating and surface hardness improvement after curing.

[Formation of Underlying Layer]

An underlying layer is formed by applying the underlying layer coating composition containing the 6-urethane (meth) acrylate (A1) to the surface of the resin substrate and then polymerizing and curing the underlying layer coating composition.

The underlying layer coating composition is usually mixed with an organic solvent for the purpose of viscosity adjustment and easy coating and is further mixed with a catalytic amount of a polymerization initiator for polymerization and curing.

Examples of the organic solvent include alcohol solvents such as methanol and isopropanol; ketone solvents such as methyl ethyl ketone and methyl isobutyl ketone; ester solvents such as isobutyl acetate; and aromatic solvents such as toluene. Alcohol solvents are suitable because they are inexpensive and cause less damage to the resin substrate.

The amount of organic solvent used may be such that the viscosity of the underlying layer coating composition is within a range suitable for coating without causing drooping or the like. In general, the organic solvent may be used in such an amount that the concentration of 6-urethane (meth) acrylate (A1) is 0.1% to 10% of the total mass.

There are two types of polymerization initiators, that is, a chemical curing type chemical polymerization initiator and a light curing type photopolymerization initiator, which are used according to a curing method in a curing process. A photopolymerization initiator is preferably adopted because a curing operation is simple and a device used for it is simple.

As the chemical polymerization initiator, for example, peroxides such as benzoyl peroxide, di-t-butyl peroxide, and methyl ethyl ketone peroxide are suitably adopted.

As the photopolymerization initiator, known ones can be used alone or in combination, and examples of the photopolymerization initiator include diketones such as benzyl and camphorquinone; benzoins such as benzoin, benzoin methyl ether, benzoin ethyl ether and benzoin isopropyl ether; aromatic ketones such as benzophenone and benzoylbenzoic acid; benzyl ketals such as benzyl dimethyl ketal and benzyl diethyl ketal; acetophenones such as acetophenone, 2-hydroxy-2-methyl-1-phenyl-propan-1-one, and 1-(4-dodecylphenyl)-2-hydroxy-2-methylpropan-1-one; anthraquinones such as 2-methylanthraquinone and 2-ethylanthraquinone; thioxanthones such as 2,4-dimethylthioxanthone, 2-isopropylthioxanthone and 2,4-diisopropylthioxanthone, and the like.

In order to effectively perform polymerization and curing, the polymerization initiator is usually mixed in an amount of 1 to 10 parts by mass, preferably 1 to 7 parts by mass with respect to 100 parts by mass of 6-urethane (meth)acrylate (A1). When the upper limit is exceeded, the underlying layer tends to turn yellow.

The polymerization initiator may be used in combination with various amine compounds that are known in the art and function as polymerization accelerators.

A method of applying the underlying layer coating composition is not particularly limited, and includes a dip coating method, a spray coating method, a roll coating method, a flow coating method, and the like, and is appropriately selected and adopted according to the viscosity of a coating composition, a coating thickness, a coating area, or the like.

After the application is performed, drying is performed as necessary, and then heating or light irradiation is performed for polymerization and curing, thereby forming the underlying layer.

<Hard Coat Layer>

A hard coat layer is provided on the underlying layer. The hard coat layer is a layer that contains a cured material of a urethane (meth)acrylate compound (A) containing a trifunctional or less functional urethane (meth)acrylate compound (A2) and is provided to secure the hardness and mechanical strength of the antireflection substrate.

In particular, it is preferable that the hard coat layer be formed of a cured material obtained by curing a hard coat layer coating composition, which is prepared by containing the urethane (meth)acrylate compound (A) containing 60% by mass or more of a trifunctional or less functional urethane (meth)acrylate compound [hereinafter, also referred to as tri-urethane (meth)acrylate: A2], spherical silica particles (C-1), a silane coupling agent (D), and a metal chelate compound (E).

The thickness of the hard coat layer is preferably 1 μm to 5 μm. When the thickness is less than 1 μm, characteristics such as strength of the hard coat layer will be impaired. When the thickness exceeds 5 μm, a predetermined elongation percentage cannot be achieved, and cracks and breakages occur during film insert molding, resulting in defective molding. The thickness is preferably 1 μm to 4 μm, particularly preferably 1 μm to 3 μm.

[Trifunctional or Less Functional Urethane (Meth)Acrylate Compound (A2)]

In order to secure an elongation percentage of the antireflection substrate, it is preferable to form a cured material by containing 60% by mass or more of the 3-urethane (meth)acrylate (A2) as the urethane (meth)acrylate compound.

When the amount of 3-urethane (meth)acrylate (A2) is less than 60% by mass, it is difficult to control the elongation percentage of the antireflection substrate within a predetermined range, and using the antireflection substrate for film insert molding tends to result in the occurrence of cracks or breakages. From the above-described point of view, when the 3-urethane (meth)acrylate (A2) is contained in the total urethane (meth)acrylate compound in an amount of 60% to 70% by mass, the elongation percentage is 120% or more, which is suitable. In particular, when the 3-urethane (meth) acrylate (A2) is contained in an amount of 70% to 85% by mass, the elongation percentage is 150% to 160%, which is suitable.

When the amount of 3-urethane (meth)acrylate (A2) is 100% by mass, it is preferable from the viewpoint of an elongation percentage, but it is not preferable in that chemicals easily penetrate into the resin substrate. Thus, it is preferable to use the 3-urethane (meth)acrylate (A2) in combination with a tetrafunctional or higher functional urethane (meth)acrylate compound [hereinafter, also referred to as 4-urethane (meth)acrylate: A3]. A particularly preferred combination use example is a combination of the 3-urethane (meth)acrylate (A2) and the above-described 6-urethane (meth)acrylate (A1) from the viewpoint of preventing permeation of chemicals.

Similarly to the 6-urethane (meth)acrylate (A1), the 3-urethane (meth)acrylate (A2) is obtained by addition reaction of a terminal isocyanate compound, which is obtained by reacting a polyol compound and a diisocyanate compound, and a (meth)acrylate compound having a plurality of hydroxyl groups. For example, pentaerythritol mono(meth) acrylate is reacted with a terminal isocyanate compound, and urethane acrylate with one (meth)acryloyl group introduced at each of both terminals is used as bifunctional urethane acrylate. Pentaerythritol mono(meth)acrylate and pentaerythritol di(meth)acrylate are reacted with a terminal isocyanate compound, and the isocyanate compound with one (meth)acryloyl group introduced into one terminal thereof and two (meth)acryloyl groups introduced into the other terminal thereof is used as trifunctional urethane acrylate.

The polyol compound, the diisocyanate compound, and the (meth)acrylate compound used as raw materials can be adopted as they are shown in the section of the 6-urethane (meth)acrylate (A1), but needs to be used at a quantitative ratio at which a (meth)acryloyl group is set to 3 molar times or less.

Note that these 3-urethane (meth)acrylates (A2) are, for example, Art Resin Series (Negami Kogyo Co., Ltd.), U/UA series (Shin-Nakamura Chemical Co., Ltd.), Shikou UV Series (Nippon Synthetic Chemical Co., Ltd.), Urethane Acrylate A Series (Kyoeisha Chemical Co., Ltd.), and the like are commercially available and can be generally obtained.

[Tetrafunctional or Higher Functional Urethane (Meth) Acrylate Compound (A3)]

The 4-urethane (meth)acrylate (A3) is synthesized in accordance with the 6-urethane (meth)acrylate (A1) and the 3-urethane (meth)acrylate (A2) using similar raw materials and similar reactions. For example, pentaerythritol di(meth) acrylate is reacted with a terminal isocyanate compound, and the isocyanate compound with two (meth)acryloyl groups introduced into each of the terminals thereof is used as a 4-urethane (meth)acrylate. The 6-urethane (meth)acrylate (A1) described above is also a compound contained in the 4-urethane (meth)acrylate (A3). These are commercially available from the companies mentioned above.

[Spherical Silica Particles (C-1)]

The spherical silica particles (C-1) are particles containing silicon dioxide as a main component and having a density of 1.9 or more without cavities therein, and spherical silica particles having an average particle size of 5 nm to 500 nm and a refractive index of 1.44 to 1.5 are used. The spherical silica particles function to smoothly apply a hard coat layer coating composition in addition to maintaining the hardness of the hard coat layer. Note that, in the present invention, the average particle size refers to a particle size when a cumulative volume is 50% in a particle size distribution measured by a laser diffraction/scattering method.

The spherical silica particles (C-1) are used in an amount of 30 to 80 parts by mass with respect to 100 parts by mass of the urethane (meth)acrylate compound (A). The spherical silica particles are contained in the hard coat layer within such a range, and thus it is possible to smoothly apply the hard coat layer coating composition over the entire hard coat layer while maintaining basic characteristics such as hardness and to effectively prevent the occurrence of cracks and breakages during film insert molding. The amount of spherical silica particles is preferably 30 to 70 parts by mass, particularly preferably 35 to 60 parts by mass.

The spherical silica particles (C-1) are usually commercially available in a state of being dispersed in a solvent. This solvent is a part of an organic solvent in the hard coat layer coating composition to be described below.

[Silane Coupling Agent (D)]

The silane coupling agent (D) stably disperses and retains the spherical silica particles (C-1) in a cured material, that is, suppresses aggregation of the particles and maximizes the effect of adding the spherical silica particles. Furthermore, the silane coupling agent functions to secure adhesion between the resin substrate which is a lower layer and the intermediate refractive index layer which is an upper layer.

In particular, since the silane coupling agent (D) is also contained in the intermediate refractive index layer which is an upper layer, high adhesion is exhibited between the intermediate refractive index layer and the hard coat layer. In addition, the silane coupling agent (D) can be hydrolyzed and polycondensed at the same time to form a polymer that is linking in a network shape by Si—O—Si bonding, thereby making the hard coat layer dense.

As the silane coupling agent (D), any known compound that has a reactive hydrolyzable group and an organic functional group chemically bonded to an organic material and has a function of coupling an organic material and an inorganic material is adopted without any restrictions.

Specifically, examples of the silane coupling agent include γ-(meth)acryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltriethoxysilane, γ-aminopropylmethyldimethoxysilane, N-(β-aminoethyl)-γ-aminopropyltrimethoxysilane, γ-anilinopropyltrimethoxysilane, γ-(N-styrylmethyl-β-aminoethylamino)propyltrimethoxysilane hydrochloride, γ-mercapto propyltrimethoxysilane, and the like.

The silane coupling agent (D) is used in an amount of 5 to 15 parts by mass with respect to 100 parts by mass of the urethane (meth)acrylate compound (A). When the amount of silane coupling agent is less than 5 parts by mass, its effect is difficult to be exhibited. When the amount of silane coupling agent exceeds 15 parts by mass, smoothness of the hard coat layer tends to be impaired. The amount of silane coupling agent is preferably 5 to 13 parts by mass, particularly preferably 6 to 10 parts by mass.

[Metal Chelate Compound (E)]

The metal chelate compound (E) functions to introduce a crosslinked structure into the hard coat layer to make the hard coat layer denser.

As described above, the hard coat layer of the present invention uses a large amount of 3-urethane (meth)acrylate (A2), and thus the hard coat layer is highly flexible but less dense. The metal chelate compound (E) is used to compensate for a reduction in denseness without impairing flexibility. In addition, since the metal chelate compound (E) is contained in the antireflection layer, adhesion between the hard coat layer and antireflection layer is further enhanced, and thus it is possible to effectively prevent breakages and the like during film insert molding.

The metal chelate compound (E) is a compound in which a chelating agent containing a bistatic ligand as a representative example is coordinated with a metal such as titanium, zirconium, or aluminum, and these known compounds can be used without any restrictions.

Specifically, examples of the metal chelate compound include titanium chelate compounds such as triethoxy-mono (acetylacetonato)titanium, diethoxy-bis(acetylacetonato)titanium, monoethoxy-tris(acetylacetonato)titanium, tetrakis (acetylacetonato)titanium, triethoxy-mono(ethylacetoacetate)titanium, diethoxy bis(ethylacetoacetate)titanium, monoethoxy tris(ethylacetoacetate)titanium, mono(acetylacetonato) tris(ethylacetoacetate)titanium, bis(acetylacetonate)bis(ethylacetoacetate)titanium, and tris(acetylacetonate)mono(ethylacetoacetate)titanium; zirconium chelate compounds such as triethoxy mono(acetylacetonato) zirconium, diethoxy bis(acetylacetonato) zirconium, monoethoxy tris(acetylacetonato)zirconium, tetrakis(acetylacetonato)zirconium, triethoxy mono(ethylacetoacetate)zirconium, diethoxy bis(ethylacetoacetate)zirconium, monoethoxy tris (ethylacetoacetate)zirconium, tetrakis(ethylacetoacetate)zirconium, mono(acetylacetonato) tris(ethylacetoacetate)zirconium, bis(acetylacetonato)bis(ethylacetoacetate)zirconium, and tris(acetylacetonato)mono(ethylacetoacetate)zirconium; and aluminum chelate compounds such as diethoxy mono (acetylacetonato)aluminum, monoethoxy bis(acetylacetonato)aluminum, di-i-propoxy mono(acetylacetonato)aluminum, monoethoxy bis(ethylacetoacetate)aluminum, diethoxy mono(ethylacetoacetate)aluminum, and aluminum triacetylacetonate.

The metal chelate compound (E) is used in an amount of 0.1 to 1.5 parts by mass with respect to 100 parts by mass of the urethane (meth)acrylate compound (A). By using the metal chelate compound within this range, the hard coat layer becomes dense to improve mechanical properties such as hardness. The amount of metal chelate compound is preferably 0.3 to 1.2 parts by mass, particularly preferably 0.5 to 1.0 parts by mass.

[Formation of Hard Coat Layer]

The hard coat layer is formed by applying the hard coat layer coating composition to the underlying layer, performing drying as necessary, and performing polymerization and condensation curing. The hard coat layer coating composition is prepared by suitably including 30 to 80 parts by mass of the spherical silica particles (C-1), 5 to 15 parts by mass of the silane coupling agent (D), and 0.1 to 1.5 parts by mass of the metal chelate compound (E) with respect to 100 parts by mass of the urethane (meth)acrylate compound (A) containing 60% by mass or more of the 3-urethane (meth) acrylate compound (A2).

Similarly to the underlying layer coating composition, the coating composition is suitably mixed with an organic solvent for viscosity adjustment and easy coating and is further mixed with a catalytic amount of a polymerization initiator for polymerization and curing. Further, in order to proceed with condensation curing, a catalytic amount of a hydrolysis catalyst is mixed. As the hydrolysis catalyst, aqueous solutions of acids such as hydrochloric acid, sulfuric acid, nitric acid, and acetic acid are used.

From the viewpoint of coating properties, the organic solvent is usually used such that the total concentration of the components (A), (C-1), (D) and (E) is 15% to 40% by mass.

A method of preparing the hard coat layer coating composition is not particularly limited. In general, the hard coat layer coating composition is prepared by proceeding with hydrolysis by mixing the silane coupling agent (D) and the hydrolysis catalyst in advance, and then adding the hydrolyzate solution, the urethane (meth)acrylate compound (A), the spherical silica particles (C-1) or a suspension thereof, the metal chelate compound (E), and a polymerization initiator to a solvent. All of the components may be added to the solvent at once and mixed.

The hard coat layer coating composition is applied and cured in the same manner as the underlying layer described above.

<Antireflection Layer>

An antireflection layer is provided on the hard coat layer. The antireflection layer has a three-layered structure in which an intermediate refractive index layer, a high refractive index layer, and a low refractive index layer are laminated in this order from the hard coat layer side.

The intermediate refractive index layer has a refractive index of 1.50 to 1.75, the high refractive index layer has a refractive index of 1.60 to 2.00, and the low refractive index layer has a refractive index of 1.25 to 1.40. The refractive index of the high refractive index layer is greater than that of the intermediate refractive index layer.

The intermediate refractive index layer, the high refractive index layer, and the low refractive index layer are all characterized in that they contain a cured material of an organic/inorganic composite compound (B). Thereby, the obtained antireflection substrate exhibits high elongation properties, and the antireflection substrate can be mass-produced constantly and stably. When the refractive index layers do not contain the cured material of the organic/inorganic composite compound (B), some defective products may be produced depending on preparation conditions, coating conditions, curing conditions, and the like of a coating composition for each layer, and it is difficult to stably mass-produce the antireflection substrate with a high elongation percentage.

[Intermediate Refractive Index Layer]

The intermediate refractive index layer containing the cured material of the organic/inorganic composite compound (B) and having a refractive index of 1.50 to 1.75 is provided on the hard coat layer.

The intermediate refractive index layer is formed of a cured material formed by curing an intermediate refractive index layer coating composition which is prepared by suitably including 50 to 170 parts by mass of metal oxide particles (F), 50 to 100 parts by mass of the silane coupling agent (D), and 1 to 10 parts by mass of the metal chelate compound (E) with respect to 100 parts by mass of the organic/inorganic composite compound (B).

The thickness of the intermediate refractive index layer is generally 50 nm to 200 nm, preferably 50 nm to 150 nm, particularly preferably 60 nm to 100 nm. When the thickness is less than 50 nm, the original function of the intermediate refractive index layer cannot be exhibited. When the thickness exceeds 200 nm, the intermediate refractive index layer does not function as an interference film and tends to lose antireflection performance.

[Organic/Inorganic Composite Compound (B)]

The intermediate refractive index layer of the present invention is characterized in that it contains the organic/inorganic composite compound (B).

The organic/inorganic composite compound (B) is, for example, a composite compound which is bonded to an alkoxysilyl group and is obtained by reacting a hydrolyzable alkoxysilane compound with a bisphenol A-type epoxy resin with an epoxy equivalent of 180 to 5000. When the composite compound is cured, cross-linking of a terminal epoxy group and high-order siloxane cross-linking (silica generation) due to a solgel reaction of the alkoxysilyl group occur. It becomes a cured material that has advantages of both organic and inorganic materials without Tg like glass.

There are various types of organic/inorganic composite compounds (B). For example, the organic/inorganic composite compounds (B) are composite compounds having a structure in which an alkoxysilyl group is bonded to a polymer such as a bisphenol A-type epoxy resin, a novolac phenol resin, or a polyamic acid compound.

In the present invention, as the organic/inorganic composite compound (B), a composite compound in which an alkoxysilyl group is bonded to a bisphenol A-type epoxy compound (alkoxy group-containing silane-modified epoxy compound) is suitably used from the viewpoint of exhibiting high elongation characteristics without minimizing a reduction in the hardness of the intermediate refractive index layer and being easy to obtain.

[Metal Oxide Particles (F)]

The intermediate refractive index layer contains the metal oxide particles (F) in order to adjust a refractive index to a predetermined value.

Examples of the particles include zirconia particles (refractive index of 2.40), titania particles (refractive index of 2.70), alumina particles (refractive index of 1.78), antimony oxide particles (refractive index of 2.04), composite zirconium metal oxide particles in which a refractive index is adjusted by combining zirconium oxide and other oxides such as silicon oxide at a molecular level, composite titanium metal oxide particles in which a refractive index is adjusted by combining titanium oxide and other oxides such as silicon oxide and zirconium oxide at a molecular level, and the like, and the refractive index is adjusted by mixing these particles individually or in combination. Considering dispersibility in an organic solvent, stability of a coating composition, and adhesion, zirconia particles are preferably used.

When an average particle size of the particles is excessively large, light scattering occurs and optical characteristics of the layer deteriorate, and thus it is preferable that the average particle size be usually 20 nm to 100 nm which does not greatly exceed the thickness of the intermediate refractive index layer.

The metal oxide particles (F) are usually mixed in an amount of 50 to 170 parts by mass, preferably 55 to 165 parts by mass, particularly preferably 60 to 155 parts by mass with respect to 100 parts by mass of the organic/ inorganic composite compound (B). When the amount of metal oxide particles mixed is small, a predetermined refractive index cannot be maintained. When the amount of metal oxide particles mixed is large, the intermediate refractive index layer becomes hard, and an elongation percentage is lowered, thereby not only impairing the features of the present invention but also making the layer itself brittle.

The metal oxide particles (F) are usually commercially available in a state of being dispersed in a solvent. This solvent is a part of an organic solvent in the intermediate refractive index layer coating composition to be described below.

[Silane Coupling Agent (D)]

The silane coupling agent (D) is a component that functions to stably disperse and retain the metal oxide particles (F) and other components in a cured material and adjusts the refractive index of the layer. As the silane coupling agent (D), the compounds used for the hard coat layer mentioned above can be used without any restrictions.

The silane coupling agent (D) is usually used in an amount of 50 to 100 parts by mass, preferably 50 to 85 parts by mass, particularly preferably 50 to 75 parts by mass with respect to 100 parts by mass of the organic/inorganic composite compound (B). When the amount of silane coupling agent mixed is small, the dispersibility of the metal oxide particles (F) in the intermediate refractive index layer decreases, and when the amount of silane coupling agent mixed is large, the intermediate refractive index layer becomes hard, and an elongation percentage is lowered, thereby impairing the features of the present invention.

[Metal Chelate Compound (E)]

As the metal chelate compound (E), the compounds used for the hard coat layer mentioned above can be used for the same purpose without any restrictions.

The metal chelate compound (E) is used in an amount of 1 to 10 parts by mass with respect to 100 parts by mass of the organic/inorganic composite compound (B). By using the metal chelate compound within this range, the intermediate refractive index layer becomes dense to improve mechanical properties thereof. The amount of metal chelate compound is preferably 2 to 8 parts by mass, particularly preferably 3 to 7 parts by mass.

[Formation of Intermediate Refractive Index Layer]

The intermediate refractive index layer is formed by applying the intermediate refractive index layer coating composition to the surface of the hard coat layer and then performing condensation curing thereon. The intermediate refractive index layer coating composition is prepared by including the organic/inorganic composite compound (B), the metal oxide particles (F), the silane coupling agent (D), and the metal chelate compound (E).

Similarly to the hard coat layer coating composition, the coating composition is suitably mixed with an organic solvent for viscosity adjustment and easy coating and is further mixed with a catalytic amount of a hydrolysis catalyst in order to proceed with condensation curing.

As the organic solvent, the metal oxide particles (F) to be contained in the intermediate refractive index layer are usually commercially available in the form of a suspension dispersed in an alcohol solvent, and thus it is preferable to use an alcohol solvent. The amount of organic solvent to be used is based on the hard coat layer coating composition.

Examples of the hydrolysis catalyst include aqueous solutions of acids such as hydrochloric acid, sulfuric acid, nitric acid, and acetic acid.

A method of preparing the intermediate refractive index layer coating composition is not particularly limited, and the intermediate refractive index layer coating composition is usually prepared by adding a hydrolyzate solution, which is obtained by mixing the silane coupling agent (D) and the hydrolysis catalyst in advance, the metal oxide particles (F) or its suspension, and the metal chelate compound (E) to a solution which is prepared by dissolving the organic/inorganic composite compound (B) in a solvent. All of the components may be added to the solvent at once and mixed.

The intermediate refractive index layer coating composition is applied in the same manner as the underlying layer described above. After the application is performed, drying is performed as necessary, and then heating is performed for 20 minutes at 70° C. to 90° C. for condensation curing, thereby forming the intermediate refractive index layer.

[High Refractive Index Layer]

In order for the antireflection substrate of the present invention to exhibit high antireflection performance, a high refractive index layer having a refractive index set to 1.60 to 2.00 and containing a cured material of the organic/inorganic composite compound (B) is provided between the above-described intermediate refractive index layer and a low refractive index layer to be described later. Note that the refractive index of the high refractive index layer has to be necessarily higher than that of the intermediate refractive index layer.

The high refractive index layer is suitably formed of a cured material of a high refractive index layer coating composition which is prepared by including 500 to 1500 parts by mass of the metal oxide particles (F), 100 to 300 parts by mass of the silane coupling agent (D), and 10 to 30 parts by mass of the metal chelate compound (E) with respect to 100 parts by mass of the organic/inorganic composite compound (B).

The thickness of the high refractive index layer is usually 50 nm to 200 nm, preferably 50 nm to 150 nm, particularly preferably 60 nm to 100 nm.

[Formation of High Refractive Index Layer]

The high refractive index layer is formed by applying the high refractive index layer coating composition to the intermediate refractive index layer laminated on the hard coat layer and then performing condensation curing thereon. The high refractive index layer coating composition is prepared by including the organic/inorganic composite compound (B), the metal oxide particles (F), the silane coupling agent (D), and the metal chelate compound (E).

For each of the organic/inorganic composite compound (B), the metal oxide particles (F), the silane coupling agent (D), and the metal chelate compound (E), the compounds described in the section of the intermediate refractive index layer are similarly used for the same purpose.

The metal oxide particles (F) are contained in an amount in a range of 500 to 1500 parts by mass with respect to 100 parts by mass of the organic/inorganic composite compound (B), and compounds are selected from the metal oxide particles (F) or used in combination so that a refractive index is 1.60 to 2.00.

The silane coupling agent (D) is contained in an amount in a range of 100 to 300 parts by mass with respect to 100 parts by mass of the organic/inorganic composite compound (B) in order to stably disperse and retain the metal oxide particles (F) and other components in the high refractive index layer.

The metal chelate compound (E) is contained in an amount in a range of 10 to 30 parts by mass with respect to 100 parts by mass of the organic/inorganic composite compound (B) in order to make the high refractive index layer dense and improve mechanical properties thereof.

In addition, the high refractive index layer coating composition is suitably mixed with an organic solvent for the purpose of viscosity adjustment and easy coating and is further mixed with a catalytic amount of a hydrolysis catalyst in order to proceed with condensation curing.

The high refractive index layer coating composition is prepared, applied, and cured in the same manner as the intermediate refractive index layer coating composition.

[Low Refractive Index Layer]

A low refractive index layer containing a cured material of the organic/inorganic composite compound (B) and having a refractive index set to 1.25 to 1.40 is provided on the high refractive index layer. When the refractive index deviates from this range, the low refractive index layer does not function as an antireflection layer.

The low refractive index layer is suitably formed of a cured material of a low refractive index layer coating composition which is prepared by including 100 to 300 parts by mass of hollow silica particles (C-2), 20 to 150 parts by mass of the silane coupling agent (D), and 1 to 10 parts by mass of the metal chelate compound (E) with respect to 100 parts by mass of the organic/inorganic composite compound (B).

The thickness of the low refractive index layer is usually 50 nm to 200 nm, preferably 55 nm to 150 nm, particularly preferably 60 nm to 100 nm. When the thickness is less than 50 nm, it is difficult to exhibit antireflection performance, and when the thickness exceeds 200 nm, the low refractive index layer does not function as an interference film and tends to lose antireflection performance.

[Hollow Silica Particles (C-2)]

The hollow silica particles (C-2) are particles used to control the refractive index of the low refractive index layer, and are silica particles characterized in that they have cavities therein. In general, the refractive index thereof is 1.44 or less, and the average particle size thereof is 10 nm to 150 nm. From the viewpoint of antireflection performance and a haze rate (light transmittance), a preferred average particle size is 50 nm to 100 nm, and a particularly preferred average particle size is 50 nm to 70 nm.

The hollow silica particles (C-2) are contained in an amount in a range of 100 to 300 parts by mass with respect to 100 parts by mass of the organic/inorganic composite compound (B) and is used such that a refractive index is 1.25 to 1.40 in consideration of refractive indices of other components.

The above-described hollow silica particles (C-2) are usually commercially available in a state of being dispersed in a solvent. This solvent is a part of the above-described organic solvent in the low refractive index layer coating composition.

[Formation of Low Refractive Index Layer]

The low refractive index layer is formed by applying the low refractive index layer coating composition to the high refractive index layer and then performing condensation curing. The low refractive index layer coating composition is prepared by including the organic/inorganic composite compound (B), the hollow silica particles (C-2), the silane coupling agent (D), and the metal chelate compound (E).

For each of the organic/inorganic composite compound (B), the silane coupling agent (D), and the metal chelate compound (E), the compounds described in the section of the intermediate refractive index layer are similarly used for the same purpose.

The silane coupling agent (D) are contained in an amount in a range of 20 to 150 parts by mass with respect to 100 parts by mass of the organic/inorganic composite compound (B) in order to stably disperse and retain the hollow silica particles (C-2) and other components in the low refractive index layer.

The metal chelate compound (E) is contained in an amount in a range of 1 to 10 parts by mass with respect to 100 parts by mass of the organic/inorganic composite compound (B) in order to make the low refractive index layer dense and improve mechanical properties thereof.

In addition, the low refractive index layer coating composition is suitably mixed with an organic solvent for the purpose of viscosity adjustment and easy coating and is further mixed with a catalytic amount of a polymerization initiator in order to proceed with condensation curing.

The low refractive index layer coating composition is prepared, applied, and cured in the same manner as the intermediate refractive index layer coating composition.

<Cover Layer>

A cover layer is provided to protect the surface of the antireflection substrate from physical damage such as scratches.

A cured material of the organic/inorganic composite compound (B) also needs to be contained in the cover layer. When there is no cured material, the cover layer cannot be extended following other layers such as the antireflection layer when film insert molding is performed using the antireflection substrate, and peeling-off occurs at an interface between the cover layer and the antireflection layer, resulting in defective molding.

The cover layer is suitably formed of a cured material of a cover layer coating composition prepared by including 10 to 80 parts by mass of the silane coupling agent (D) and 1 to 10 parts by mass of the metal chelate compound (E) with respect to 100 parts by mass of the organic/inorganic composite compound (B).

When the thickness of the cover layer is 10 nm to 20 nm, the cover layer functions as a protection layer.

[Formation of Cover Layer]

The cover layer is formed by applying the cover layer coating composition to the low refractive index layer and then performing condensation curing thereon. The cover layer coating composition is prepared by including the organic/inorganic composite compound (B), the silane coupling agent (D), and the metal chelate compound (E).

For each of the organic/inorganic composite compound (B), the silane coupling agent (D), and the metal chelate compound (E), the compounds described in the section of the intermediate refractive index layer are similarly used for the same purpose.

The silane coupling agent (D) is contained in an amount in a range of 10 to 80 parts by mass with respect to 100 parts by mass of the organic/inorganic composite compound (B) in order to stably disperse and retain the components in the cover layer.

The metal chelate compound (E) is contained in an amount in a range of 1 to 10 parts by mass with respect to 100 parts by mass of the organic/inorganic composite compound (B) in order to make the cover layer dense and improve mechanical properties thereof.

The cover layer coating composition is suitably mixed with an organic solvent for the purpose of viscosity adjustment and easy coating, and is further mixed with a catalytic amount of a hydrolysis catalyst in order to proceed with condensation curing.

The cover layer coating composition is prepared, applied, and cured in the same manner as the intermediate refractive index layer coating composition.

<Film Insert Molding>

The antireflection substrate formed in this manner is disposed, for example, in a predetermined mold and is formed to fit a mold surface while being heated, and then a predetermined resin is injected and cured thereinto, thereby making it possible to obtain a molding having a predetermined shape of which the surface has antireflection performance. Note that, as a resin to be injected, a transparent thermoplastic resin, such as a polycarbonate resin or an acrylic resin, which has good heat-sealing properties with respect to the resin substrate is suitably adopted.

Further, the antireflection substrate can also be used for thermal shaping and thermoforming such as embossing by hot pressing and bending, in addition to film insert molding.

Since the antireflection substrate of the present invention has excellent elongation characteristics, the occurrence of cracks in the hard coat layer, the antireflection layer, and the cover layer and peeling-off at interfaces between the layers are effectively prevented during film insert molding. Moreover, the antireflection substrate having the characteristics can be stably mass-produced regardless of fluctuations in manufacturing conditions. As a result, it is possible to avoid a decrease in yield due to defective molding during film insert molding and achieve high productivity.

The antireflection substrate for film insert molding can be applied to molding of front panels of optical display surfaces of, for example, CRTs, LCDs, plasma displays, and the like, and front clear covers of automobile instrument panels.

EXAMPLES

The present invention will be specifically described below with reference to Examples, but the present invention is not limited by these Examples. In addition, not all combinations of features described in Examples are essential for the solution of the present invention.

Various components, abbreviations, and test methods used in the following Examples and Comparative Examples are as follows.

Urethane (Meth)Acrylate Compound (A)
Hexafunctional or Higher Functional Urethane (Meth)Acrylate Compound (A1)
    A1-6: urethane acrylate prepolymer with six acrylate groups at the terminal (6-urethane acrylate)
Trifunctional or Less Functional Urethane (Meth)Acrylate Compound (A2)
    A2-2: urethane acrylate with two acrylate groups at the terminal (2-urethane acrylate)
    A2-2.5: urethane acrylate with 2.5 acrylate groups at the terminal (2.5 urethane acrylate)
Tetrafunctional or Higher Functional Urethane (Meth)Acrylate Compound (A3)
    A1-6: same as the above compound
Organic/Inorganic Composite Compound (B)
    ASE: bisphenol A-type epoxy compound modified with a trialkoxymethylsilyl group
        Dispersion solvent: diethylene glycol dimethyl ether (DGLM), Solid content of 50% by mass
Silica Particles (C)
    C-1: spherical silica particles (average particle size=7 nm, refractive index=1.46)
        Dispersion solvent: isopropyl alcohol (IPA),
        Solid content of 20% by mass
    C-2: hollow silica particles (average particle size=60 nm, refractive index=1.25)
        Dispersion solvent: isopropyl alcohol (IPA),
        Solid content of 20% by mass Silane Coupling Agent (D)
    γ-GPS: γ-glycidoxypropyltrimethoxysilane
    γ-APS: γ-acryloxypropyltrimethoxysilane
Metal Chelate Compound (E)
    AlAA: aluminum trisacetyl acetate
Metal Oxide Particles (F)
    $ZrO_2$(60): average particle size=60 nm to 70 nm, refractive index=2.40
        Dispersing solvent: 1-methoxy-2-propanol (PGM),
        Solid content of 53% by mass
    $ZrO_2$(20): average particle size=20 nm to 30 nm, refractive index=2.20
        Dispersion solvent: butyl alcohol (BuOH)/ethyl alcohol (EtOH) mixed solvent,
        Solid content of 20% by mass
Resin Substrate
    PC: polycarbonate resin (thickness of 300 μm, Tg=140° C.) Total light transmittance=90%
    Organic solvent
    IPA: isopropyl alcohol
    MIBK: methyl isobutyl ketone
    SBAC: acetic acid sec-butyl ester
    PGM: 1-methoxy-2-propanol
    BuOH: butyl alcohol
    EtOH: ethyl alcohol
    Etacohol: a mixture of ethyl alcohol and isopropyl alcohol
Hydrolysis Catalyst
    HCl: 0.05N hydrochloric acid aqueous solution Polymerization initiator
    APPI: alkylphenone photopolymerization initiator UV absorber
    UV1: benzotriazole type UV absorber
(1) Elongation Percentage Heat was applied for approximately 30 seconds at a softening temperature of the resin substrate (140° C.), and bending was performed using various 90° bending jigs with R. Based on an R value of the bending jig that did not cause a crack, an extended length (circumference) outside the antireflection substrate was calculated (¼×π×R for 90°). A value calculated by subtracting the thickness of the antireflection substrate from the extended length of the outside was set to be an inner circumference {¼×π (R-antireflection substrate thickness)} on the assumption that extension did not occur inside the antireflection substrate. A ratio of the extended outer circumference with respect to the inner circumference of 100 was obtained, and this value was set to be an elongation percentage.

(2) Total Light Transmittance

Regarding a total light transmittance, a maximum transmittance value in a range of wavelengths 780 nm to 380 nm was measured at a scanning speed of 1000 nm/min by using V-550+integrating sphere manufactured by JASCO Corporation, and this value was set to be the total light transmittance.

(3) Reflectance

In order to prevent reflection from the resin substrate, black printing was performed on one surface of the antireflection substrate (the surface on which no antireflection layer was laminated). An average luminous reflectance (SCI-Y value) on the surface of the antireflection substrate was measured under the same conditions by using the same tester as for the total light transmittance. A smaller value indicates better antireflection performance.

(4) Abrasion Resistance

Abrasion resistance was evaluated by visually determining whether a scratch has occurred when attached white cloth cotton for testing [Kanakin No. 3 manufactured by Japanese Standards Association] was reciprocated 3000 times on the surface of a test body at a pressure of 500 g/cm². Determination criteria are as follows. In this test, transmitted light means light that has passed through the antireflection substrate, and reflected light means light that has been reflected from the surface of the antireflection substrate.

◉: No scratch was confirmed from the observation of either the transmitted light or the reflected light.

○: Several scratches were confirmed from the observation of the transmitted light, but no scratch was confirmed from the reflected light.

Δ: Several scratches were confirmed from the observation of either the transmitted light or the reflected light.

x: More than 10 scratches were confirmed from the observation of either the transmitted light or the reflected light.

(5) Manufacturing Stability

1. Coating Stability

Antireflection substrates obtained in Examples and Comparative Examples were visually evaluated, and those that had no change in appearance such as liquid repellency or whitening were regarded as acceptable products. Ten antireflection substrates were manufactured, and the number of acceptable sheets was used as an index of coating stability.

2. Elongation Stability

The antireflection substrates obtained in Examples and Comparative Examples were heated at a softening temperature (140° C.) for 30 seconds, and the presence or absence of bending cracks was observed using a 90° bending jigs with R (R value: 2).

The appearance was observed, and those having cracks in the antireflection layers thereof were regarded as rejected products. Ten antireflection substrates were manufactured, the number of acceptable sheets was used as an index of elongation stability.

Example 1

A polycarbonate resin substrate (80 mm×50 mm×0.3 mm) was used as a resin substrate, an underlying layer coating composition with the following formula was applied to the surface of the resin substrate by dip coating, heating was performed thereon at 60° C. for 5 minutes, and then ultraviolet light was emitted for one minute using a high-pressure mercury lamp. As a result, an underlying layer of 80 nm was formed on the surface of the resin substrate.

[Underlying Layer Coating Composition]:

(A1): A1-6 5.2 g

Photopolymerization initiator: APPI 0.1 g

Organic solvent: IPA 203.8 g/SBAC 50.9 g

Next, a hard coat layer coating composition having the following formula was applied to the surface of the underlying layer by dip coating, heating was performed thereon at 60° C. for 5 minutes, and then ultraviolet light was emitted for one minute using a high-pressure mercury lamp. As a result, a hard coat layer of 1.5 μm was formed on the surface of the underlying layer.

[Hard coat layer coating composition]: A composition ratio per 100 parts by mass of the urethane (meth)acrylate compound (A3+A2) is shown in parentheses.

(A3): A1-6 5.5 g (A2): A2-2 31.0 g (C): Spherical silica particles (C-1) 16.8 g (46) Dispersion solvent: IPA 67.2 g (D): γ-GPS 3.4 g (9.3)

(E): AlAA 0.3 g (0.8)

Photopolymerization initiator: APPI 2.8 g

Hydrolysis catalyst: HCl 0.8 g

UV absorber: UV1 2.7 g

Organic solvent: IPA 62.8 g/MIBK 86.7 g

Next, an intermediate refractive index layer coating composition having the following formula was applied to the surface of the hard coat layer by dip coating, and then heating was performed thereon at 80° C. for 20 minutes. As a result, an intermediate refractive index layer having a refractive index of 1.69 and a thickness of 75 nm was formed on the surface of the hard coat layer.

[Intermediate refractive index layer coating composition]: A composition ratio per 100 parts by mass of the organic/inorganic composite compound (B) is shown in parentheses.

(B): ASE 3.1 g (100)

Dispersing solvent: DGLM 3.0 g (F): ZrO2(60) 4.8 g (154.8)

Dispersion solvent: PGM 4.3 g (D): γ-GPS 1.9 g (61.3)

(E): AlAA 0.1 g (3.2)

Hydrolysis catalyst: HCl 1.2 g

Organic solvent: IPA 100.3 g/SBAC 151.3 g

Next, a high refractive index layer coating composition having the following formulation was applied to the surface of the intermediate refractive index layer by dip coating, and then heating was performed thereon at 80° C. for 20 minutes. As a result, a high refractive index layer having a refractive index of 1.80 and a thickness of 70 nm was formed on the surface of the intermediate refractive index layer.

[High refractive index layer coating composition]: A composition ratio per 100 parts by mass of the organic/inorganic composite compound (B) is shown in parentheses.

(B): ASE 0.5 g (100)

Dispersing solvent: DGLM 0.5 g (F): ZrO$_2$ (20) 6.5 g (1300)

Dispersion solvent: BuOH/EtOH 36.5 g (D): γ-GPS 1.4 g (280)

(E): AlAA 0.1 g (20)

Hydrolysis catalyst: HCl 0.3 g

Organic solvent: Etacohol 112.1 g/SBAC 112.1 g

Next, a low refractive index layer coating composition having the following formula was applied to the surface of the high refractive index layer by dip coating, and then heating was performed thereon at 80° C. for 20 minutes. As a result, a low refractive index layer having a refractive index of 1.28 and a thickness of 85 nm was formed on the surface of the high refractive index layer.

[Low refractive index layer coating composition]: A composition ratio per 100 parts by mass of the organic/inorganic composite compound (B) is shown in parentheses.

(B): ASE 1.3 g (100)

Dispersing solvent: DGLM 1.2 g (C): Hollow silica particles (C-2) 2.6 g (200)

Dispersion solvent: IPA 10.4 g (D): γ-GPS 1.6 g (123.1)

(E): AlAA 0.1 g (7.7)

Hydrolysis catalyst: HCl 0.4 g

Organic solvent: IPA 121.2 g/MIBK 121.2 g

Next, a cover layer coating composition having the following formula was applied to the surface of the low refractive index layer by dip coating, and then heating was performed thereon at 80° C. for 20 minutes. As a result, a cover layer having a refractive index of 1.48 and a thickness of 15 nm was formed on the surface of the low refractive index layer, thereby manufacturing the antireflection substrate of the present invention.

[Cover layer coating composition]: A composition ratio per 100 parts by mass of the organic/inorganic composite compound (B) is shown in parentheses.

(B): ASE 1.4 g (100)

Dispersing solvent: DGLM 1.3 g (D): γ-GPS 0.7 g (52.1)

(E): AlAA 0.1 g (8.6)

Hydrolysis catalyst: HCl 0.5 g

Organic solvent: IPA 128.0 g/SBAC 128.0 g

A total light transmittance, reflectance, elongation percentage, abrasion resistance, and manufacturing stability (coating stability, elongation stability) of the obtained antireflection substrate were measured and evaluated according to the above-described test method. The results are shown in Table 9. Note that components of the coating compositions used for the formation of the layers, mixture quantities, the thicknesses of the layers, and the refractive indices are collectively shown in Tables 1 and 2.

Examples 2 to 14

Antireflection substrates were manufactured in the same manner as in Example 1, except that coating compositions having the compositions shown in Tables 1 to 6 were used. In addition, a total light transmittance, reflectance, elongation percentage, abrasion resistance, and manufacturing stability of each of the antireflection substrates were measured and evaluated according to the above-described test method, and the results are shown in Table 9.

TABLE 1

| Layer | Mixed components of coating composition | | Example 1 Mixture quantity | Parts by mass | Example 2 Mixture quantity | Parts by mass | Example 3 Mixture quantity | Parts by mass | Example 4 Mixture quantity | Parts by mass | Example 5 Mixture quantity | Parts by mass |
|---|---|---|---|---|---|---|---|---|---|---|---|---|
| Cover layer | (B)ASE | | 1.4 | 100.0 | 1.8 | 100.0 | 1.8 | 100.0 | 1.8 | 100.0 | 1.8 | 100.0 |
| | Dispersion solvent (DGLM) | | 1.3 | | 1.7 | | 1.7 | | 1.7 | | 1.7 | |
| | (D) γ-GPS | | 0.7 | 52.1 | 0.2 | 11.1 | 0.2 | 11.1 | 0.2 | 11.1 | 0.2 | 11.1 |
| | (E) AlAA | | 0.1 | 8.6 | 0.1 | 5.6 | 0.1 | 5.6 | 0.1 | 5.6 | 0.1 | 5.6 |
| | HCl | | 0.5 | | 0.5 | | 0.5 | | 0.5 | | 0.5 | |
| | Organic | IPA | 128.0 | | 127.8 | | 127.8 | | 127.8 | | 127.8 | |
| | solvent | SBAC | 128.0 | | 127.8 | | 127.8 | | 127.8 | | 127.8 | |
| | Total | | 260.0 | | 259.9 | | 259.9 | | 259.9 | | 259.9 | |
| | Refractive index | | 1.48 | | 1.49 | | 1.49 | | 1.49 | | 1.49 | |
| | Layer thickness | | 15 nm | | 15 nm | | 15 nm | | 15 nm | | 15 nm | |
| Hard coat layer | (A3)A1-6 | | 5.5 | 100.0 | 9.9 | 100.0 | 9.9 | 100.0 | 9.9 | 100.0 | 9.9 | 100.0 |
| | (A2)A2-2 | | 31.0 | | — | | — | | — | | — | |
| | (A2)A2-2.5 | | — | | 23.1 | | 23.1 | | 23.1 | | 23.1 | |
| | (C)C-1 | | 16.8 | 46.0 | 14.6 | 44.2 | 9.9 | 30.0 | 26.4 | 80.0 | 14.6 | 44.2 |
| | Dispersion solvent (IPA) | | 67.2 | | 58.3 | | 39.6 | | 105.6 | | 58.3 | |
| | (D) γ-GPS | | 3.4 | 9.3 | — | | — | | — | | — | |
| | (D) γ-APS | | — | | 3.0 | 9.1 | 1.7 | 5.0 | 5.0 | 15.0 | 3.0 | 9.1 |
| | (E) AlAA | | 0.3 | 0.8 | 0.2 | 0.6 | 0.03 | 0.1 | 0.50 | 1.5 | 0.2 | 0.6 |
| | Polymerization initiator APPI | | 2.8 | | 2.4 | | 2.4 | | 2.4 | | 2.4 | |
| | UV absorber UV1 | | 2.7 | | 1.0 | | 1.0 | | 1.0 | | 1.0 | |
| | HCl | | 0.8 | | 0.7 | | 0.4 | | 1.1 | | 0.7 | |
| | Organic | IPA | 62.8 | | 70.8 | | 83.6 | | 39.9 | | 70.8 | |
| | solvent | MIBK | 86.7 | | 86.0 | | 98.4 | | 55.1 | | 86.0 | |
| | Total | | 280.0 | | 270.0 | | 270.0 | | 270.0 | | 270.0 | |
| | Refractive index | | 1.50 | | 1.50 | | 1.50 | | 1.49 | | 1.50 | |
| | Layer thickness | | 1.5 μm | | 1.5 μm | | 1.5 μm | | 1.5 μm | | 1.5 μm | |
| Underlying layer | (A1)A1-6 | | 5.2 | 100.0 | 3.9 | 100.0 | 3.9 | 100.0 | 3.9 | 100.0 | 3.9 | 100.0 |
| | Polymerization initiator APPI | | 0.1 | | 0.1 | | 0.1 | | 0.1 | | 0.1 | |
| | Organic | IPA | 203.8 | | 204.8 | | 204.8 | | 204.8 | | 204.8 | |
| | solvent | SBAC | 50.9 | | 51.2 | | 51.2 | | 51.2 | | 51.2 | |
| | Total | | 260.0 | | 260.0 | | 260.0 | | 260.0 | | 260.0 | |
| | Refractive index | | 1.50 | | 1.50 | | 1.50 | | 1.49 | | 1.50 | |
| | Layer thickness | | 80 nm | | 65 nm | | 65 nm | | 65 nm | | 65 nm | |

TABLE 2

| Layer | Mixed components of coating composition | Example 1 Mixture quantity | Parts by mass | Example 2 Mixture quantity | Parts by mass | Example 3 Mixture quantity | Parts by mass | Example 4 Mixture quantity | Parts by mass | Example 5 Mixture quantity | Parts by mass |
|---|---|---|---|---|---|---|---|---|---|---|---|
| Low refractive index | (B)ASE | 1.3 | 100.0 | 2.1 | 100.0 | 2.1 | 100.0 | 2.1 | 100.0 | 2.1 | 100.0 |
| | Dispersion solvent (DGLM) | 1.2 | | 2.0 | | 2.0 | | 2.0 | | 2.0 | |
| | (C)C-2 | 2.6 | 200.0 | 2.6 | 123.8 | 2.6 | 123.8 | 2.6 | 123.8 | 2.1 | 100.0 |

TABLE 2-continued

| Layer | Mixed components of coating composition | | Example 1 Mixture quantity | Example 1 Parts by mass | Example 2 Mixture quantity | Example 2 Parts by mass | Example 3 Mixture quantity | Example 3 Parts by mass | Example 4 Mixture quantity | Example 4 Parts by mass | Example 5 Mixture quantity | Example 5 Parts by mass |
|---|---|---|---|---|---|---|---|---|---|---|---|---|
| layer | Dispersion solvent (IPA) | | 10.4 | | 10.4 | | 10.4 | | 10.4 | | 8.4 | |
| | (D) γ -GPS | | 1.6 | 123.1 | 0.6 | 28.6 | 0.6 | 28.6 | 0.6 | 28.6 | 0.4 | 20.0 |
| | (E) AIAA | | 0.1 | 7.7 | 0.1 | 4.8 | 0.1 | 4.8 | 0.1 | 4.8 | 0.02 | 1 |
| | HCl | | 0.4 | | 0.1 | | 0.1 | | 0.1 | | 0.1 | |
| | Organic | IPA | 121.2 | | 121.0 | | 121.0 | | 121.0 | | 122.5 | |
| | solvent | MIBK | 121.2 | | 121.0 | | 121.0 | | 121.0 | | 122.5 | |
| | Total | | 260.0 | | 260.0 | | 260.0 | | 260.0 | | 260.1 | |
| | Refractive index | | 1.28 | | 1.30 | | 1.30 | | 1.30 | | 1.33 | |
| | Layer thickness | | 85 nm | | 85 nm | | 85 nm | | 85 nm | | 85 nm | |
| High refractive index layer | (B)ASE | | 0.5 | 100.0 | 0.8 | 100.0 | 0.8 | 100.0 | 0.8 | 100.0 | 0.8 | 100.0 |
| | Dispersion solvent (DGLM) | | 0.5 | | 0.7 | | 0.7 | | 0.7 | | 0.7 | |
| | (F) ZrO2(20) | | 6.5 | 1300.0 | 6.1 | 762.5 | 6.1 | 762.5 | 6.1 | 762.5 | 4.0 | 500.0 |
| | Dispersion solvent *1 | | 36.5 | | 34.0 | | 34.0 | | 34.0 | | 22.7 | |
| | (D) γ -GPS | | 1.4 | 280.0 | 0.9 | 112.5 | 0.9 | 112.5 | 0.9 | 112.5 | 4.0 | 100.0 |
| | (E) AIAA | | 0.1 | 20.0 | 0.1 | 12.5 | 0.1 | 12.5 | 0.1 | 12.5 | 2.3 | 10.0 |
| | HCl | | 0.3 | | 0.2 | | 0.2 | | 0.2 | | 0.9 | |
| | Organic | Etacohol | 112.1 | | 113.6 | | 113.6 | | 113.6 | | 117.4 | |
| | solvent | SBAC | 112.1 | | 113.6 | | 113.6 | | 113.6 | | 117.4 | |
| | Total | | 270.0 | | 270.0 | | 270.0 | | 270.0 | | 270.1 | |
| | Refractive index | | 1.80 | | 1.77 | | 1.77 | | 1.77 | | 1.73 | |
| | Layer thickness | | 70 nm | | 70 nm | | 70 nm | | 70 nm | | 70 nm | |
| Intermediate refractive index layer | (B)ASE | | 3.1 | 100.0 | 6.4 | 100.0 | 6.4 | 100.0 | 6.4 | 100.0 | 6.4 | 100.0 |
| | Dispersion solvent (DGLM) | | 3.0 | | 6.2 | | 6.2 | | 6.2 | | 6.2 | |
| | (F)ZrO2(60) | | 4.8 | 154.8 | 3.9 | 60.9 | 3.9 | 60.9 | 3.9 | 60.9 | 3.2 | 50.0 |
| | Dispersion solvent (PGM) | | 4.3 | | 3.4 | | 3.4 | | 3.4 | | 2.8 | |
| | (D) γ -GPS | | 1.9 | 61.3 | 3.3 | 51.6 | 3.3 | 51.6 | 3.3 | 51.6 | 1.6 | 50.0 |
| | (E) AIAA | | 0.1 | 3.2 | 0.2 | 3.1 | 0.2 | 3.1 | 0.2 | 3.1 | 0.03 | 1.0 |
| | HCl | | 1.2 | | 2.3 | | 2.3 | | 2.3 | | 1.9 | |
| | Organic | IPA | 100.3 | | 73.3 | | 73.3 | | 73.3 | | 75.1 | |
| | solvent | SBAC | 151.3 | | 171.0 | | 171.0 | | 171.0 | | 172.8 | |
| | Total | | 270.0 | | 270.0 | | 270.0 | | 270.0 | | 270.0 | |
| | Refractive index | | 1.69 | | 1.62 | | 1.62 | | 1.62 | | 1.59 | |
| | Layer thickness | | 75 nm | | 75 nm | | 75 nm | | 75 nm | | 75 nm | |

*1 BuOH/EtOH

TABLE 3

| Layer | Mixed components of coating composition | | Example 6 Mixture quantity | Example 6 Parts by mass | Example 7 Mixture quantity | Example 7 Parts by mass | Example 8 Mixture quantity | Example 8 Parts by mass | Example 9 Mixture quantity | Example 9 Parts by mass | Example 10 Mixture quantity | Example 10 Parts by mass |
|---|---|---|---|---|---|---|---|---|---|---|---|---|
| Cover layer | (B)ASE | | 1.8 | 100.0 | 1.8 | 100.0 | 1.8 | 100.0 | 1.8 | 100.0 | 1.8 | 100.0 |
| | Dispersion solvent (DGLM) | | 1.7 | | 1.7 | | 1.7 | | 1.7 | | 1.7 | |
| | (D) γ -GPS | | 0.2 | 11.1 | 0.18 | 10.0 | 1.4 | 80.0 | 0.2 | 11.1 | 0.2 | 11.1 |
| | (E) AIAA | | 0.1 | 5.6 | 0.02 | 1.0 | 0.17 | 10.0 | 0.1 | 5.6 | 0.1 | 5.6 |
| | HCl | | 0.5 | | 0.4 | | 0.7 | | 0.5 | | 0.5 | |
| | Organic | IPA | 127.8 | | 127.9 | | 127.1 | | 127.8 | | 127.8 | |
| | solvent | SBAC | 127.8 | | 127.9 | | 127.1 | | 127.8 | | 127.8 | |
| | Total | | 259.9 | | 259.9 | | 260.0 | | 259.9 | | 259.9 | |
| | Refractive index | | 1.49 | | 1.49 | | 1.47 | | 1.49 | | 1.49 | |
| | Layer thickness | | 15 nm | | 15 nm | | 15 nm | | 15 nm | | 15 nm | |
| Hard coat layer | (A3)A1-6 | | 9.9 | 100.0 | 9.9 | 100.0 | 9.9 | 100.0 | 17.0 | 100.0 | 9.9 | 100.0 |
| | (A2)A2-2 | | – | | – | | – | | – | | – | |
| | (A2)A2-2.5 | | 23.1 | | 23.1 | | 23.1 | | 17.0 | | 23.1 | |
| | (C)C-1 | | 14.6 | 44.2 | 14.6 | 44.2 | 14.6 | 44.2 | 14.6 | 44.2 | 9.5 | 28.8 |
| | Dispersion solvent (IPA) | | 58.3 | | 58.3 | | 58.3 | | 58.3 | | 38.0 | |
| | (D) γ -GPS | | – | | – | | – | | – | | – | |
| | (D) γ -APS | | 3.0 | 9.1 | 3.0 | 9.1 | 3.0 | 9.1 | 3.0 | 9.1 | 1.6 | 4.8 |
| | (E) AIAA | | 0.2 | 0.6 | 0.2 | 0.6 | 0.2 | 0.6 | 0.2 | 0.6 | 0.03 | 0.09 |
| | Polymerization initiator APPI | | 2.4 | | 2.4 | | 2.4 | | 2.4 | | 2.4 | |
| | UV absorber UV1 | | 1.0 | | 1.0 | | 1.0 | | 1.0 | | 1.0 | |
| | HCl | | 0.7 | | 0.7 | | 0.7 | | 0.7 | | 0.4 | |
| | Organic | IPA | 70.8 | | 70.8 | | 70.8 | | 70.8 | | 84.1 | |
| | solvent | MIBK | 86.0 | | 86.0 | | 86.0 | | 85.0 | | 100.0 | |
| | Total | | 270.0 | | 270.0 | | 270.0 | | 270.0 | | 270.0 | |

TABLE 3-continued

| Layer | Mixed components of coating composition | | Example 6 | | Example 7 | | Example 8 | | Example 9 | | Example 10 | |
|---|---|---|---|---|---|---|---|---|---|---|---|---|
| | | | Mixture quantity | Parts by mass | Mixture quantity | Parts by mass | Mixture quantity | Parts by mass | Mixture quantity | Parts by mass | Mixture quantity | Parts by mass |
| | Refractive index | | 1.50 | | 1.50 | | 1.50 | | 1.50 | | 1.50 | |
| | Layer thickness | | 1.5 μm | | 1.5 μm | | 1.5 μm | | 1.5 μm | | 1.5 μm | |
| Underlying | (A1)A1-6 | | 3.9 | 100.0 | 3.9 | 100.0 | 3.9 | 100.0 | 3.9 | 100.0 | 3.9 | 100.0 |
| layer | Polymerization initiator APPI | | 0.1 | | 0.1 | | 0.1 | | 0.1 | | 0.1 | |
| | Organic | IPA | 204.8 | | 204.8 | | 204.8 | | 204.8 | | 204.8 | |
| | solvent | SBAC | 51.2 | | 51.2 | | 51.2 | | 51.2 | | 51.2 | |
| | Total | | 260.0 | | 260.0 | | 260.0 | | 260.0 | | 260.0 | |
| | Refractive index | | 1.50 | | 1.50 | | 1.50 | | 1.50 | | 1.50 | |
| | Layer thickness | | 65 nm | | 65 nm | | 65 nm | | 65 nm | | 65 nm | |

TABLE 4

| Layer | Mixed components of coating composition | | Example 6 | | Example 7 | | Example 8 | | Example 9 | | Example 10 | |
|---|---|---|---|---|---|---|---|---|---|---|---|---|
| | | | Mixture quantity | Parts by mass | Mixture quantity | Parts by mass | Mixture quantity | Parts by mass | Mixture quantity | Parts by mass | Mixture quantity | Parts by mass |
| Low | (B)ASE | | 2.1 | 100.0 | 2.1 | 100.0 | 2.1 | 100.0 | 2.1 | 100.0 | 2.1 | 100.0 |
| refractive | Dispersion solvent (DGLM) | | 2.0 | | 2.0 | | 2.0 | | 2.0 | | 2.0 | |
| index | (C)C-2 | | 6.3 | 300.0 | 2.6 | 123.8 | 2.6 | 123.8 | 2.6 | 123.8 | 2.6 | 123.8 |
| layer | Dispersion solvent (IPA) | | 25.2 | | 10.4 | | 10.4 | | 10.4 | | 10.4 | |
| | (D) γ -GPS | | 3.2 | 150.0 | 0.6 | 28.6 | 0.6 | 28.6 | 0.6 | 28.6 | 0.6 | 28.6 |
| | (E) AIAA | | 0.2 | 10 | 0.1 | 4.8 | 0.1 | 4.8 | 0.1 | 4.8 | 0.1 | 4.8 |
| | HCl | | 0.1 | | 0.1 | | 0.1 | | 0.1 | | 0.1 | |
| | Organic | IPA | 110.5 | | 121.0 | | 121.0 | | 121.0 | | 121.0 | |
| | solvent | MIBK | 110.5 | | 121.0 | | 121.0 | | 121.0 | | 121.0 | |
| | Total | | 260.1 | | 260.0 | | 260.0 | | 260.0 | | 260.0 | |
| | Refractive index | | 1.27 | | 1.30 | | 1.30 | | 1.30 | | 1.30 | |
| | Layer thickness | | 85 nm | | 85 nm | | 85 nm | | 85 nm | | 85 nm | |
| High | (B)ASE | | 0.8 | 100.0 | 0.8 | 100.0 | 0.8 | 100.0 | 0.8 | 100.0 | 0.8 | 100.0 |
| refractive | Dispersion solvent (DGLM) | | 0.7 | | 0.7 | | 0.7 | | 0.7 | | 0.7 | |
| index | (F)ZrO2(20) | | 12.0 | 1500.0 | 6.1 | 762.5 | 6.1 | 762.5 | 6.1 | 762.5 | 6.1 | 762.5 |
| layer | Dispersion solvent *1 | | 68.0 | | 34.0 | | 34.0 | | 34.0 | | 34.0 | |
| | (D) γ -GPS | | 36.0 | 300.0 | 0.9 | 112.5 | 0.9 | 112.5 | 0.9 | 112.5 | 0.9 | 112.5 |
| | (E)AIAA | | 20.4 | 30.0 | 0.1 | 12.5 | 0.1 | 12.5 | 0.1 | 12.5 | 0.1 | 12.5 |
| | HCl | | 8.2 | | 0.2 | | 0.2 | | 0.2 | | 0.2 | |
| | Organic | Etacohol | 62.0 | | 113.6 | | 113.6 | | 113.6 | | 113.6 | |
| | solvent | SBAC | 62.0 | | 113.6 | | 113.6 | | 113.6 | | 113.6 | |
| | Total | | 270.1 | | 270.0 | | 270.0 | | 270.0 | | 270.0 | |
| | Refractive index | | 1.83 | | 1.77 | | 1.77 | | 1.77 | | 1.77 | |
| | Layer thickness | | 70 nm | | 70 nm | | 70 nm | | 70 nm | | 70 nm | |
| Inter- | (B)ASE | | 6.4 | 100.0 | 6.4 | 100.0 | 6.4 | 100.0 | 6.4 | 100.0 | 6.4 | 100.0 |
| mediate | Dispersion solvent (DGLM) | | 6.2 | | 6.2 | | 6.2 | | 6.2 | | 6.2 | |
| refractive | (F)ZrO2(60) | | 10.9 | 170.0 | 3.9 | 60.9 | 3.9 | 60.9 | 3.9 | 60.9 | 3.9 | 60.9 |
| index | Dispersion solvent (PGM) | | 9.6 | | 3.4 | | 3.4 | | 3.4 | | 3.4 | |
| layer | (D) γ -GPS | | 10.9 | 100.0 | 3.3 | 51.6 | 3.3 | 51.6 | 3.3 | 51.6 | 3.3 | 51.6 |
| | (E) AIAA | | 1.0 | 10.0 | 0.2 | 3.1 | 0.2 | 3.1 | 0.2 | 3.1 | 0.2 | 3.1 |
| | HCl | | 4.0 | | 2.3 | | 2.3 | | 2.3 | | 2.3 | |
| | Organic | IPA | 61.7 | | 73.3 | | 73.3 | | 73.3 | | 73.3 | |
| | solvent | SBAC | 159.4 | | 171.0 | | 171.0 | | 171.0 | | 171.0 | |
| | Total | | 270.1 | | 270.0 | | 270.0 | | 270.0 | | 270.0 | |
| | Refractive index | | 1.70 | | 1.62 | | 1.62 | | 1.62 | | 1.62 | |
| | Layer thickness | | 75 nm | | 75 nm | | 75 nm | | 75 nm | | 75 nm | |

*1 BuOH/ EtOH

TABLE 5

| Layer | Mixed components of coating composition | | Example 11 | | Example 12 | | Example 13 | | Example 14 | |
|---|---|---|---|---|---|---|---|---|---|---|
| | | | Mixture quantity | Parts by mass | Mixture quantity | Parts by mass | Mixture quantity | Parts by mass | Mixture quantity | Parts by mass |
| Cover layer | (B)ASE | | 1.4 | 100.0 | 1.8 | 100.0 | 1.8 | 100.0 | 1.4 | 100.0 |
| | Dispersion solvent (DGLM) | | 1.3 | | 1.7 | | 1.7 | | 1.3 | |
| | (D) γ-GPS | | 0.7 | 52.1 | 0.2 | 11.1 | 0.1 | 5.6 | 1.2 | 86.0 |
| | (E)AIAA | | 0.1 | 8.6 | 0.1 | 5.6 | 0.01 | 0.6 | 0.17 | 12.1 |
| | HCl | | 0.5 | | 0.5 | | 0.4 | | 0.6 | |
| | Organic solvent | IPA | 128.0 | | 127.8 | | 127.9 | | 127.7 | |
| | | SBAC | 128.0 | | 127.8 | | 127.9 | | 127.7 | |
| | Total | | 260.0 | | 259.9 | | 259.9 | | 260.1 | |
| | Refractive index | | 1.48 | | 1.49 | | 1.50 | | 1.48 | |
| | Layer thickness | | 15 nm | | 15 nm | | 15 nm | | 15 nm | |
| Hard coat layer | (A3)A1-6 | | 5.5 | 100.0 | 9.9 | 100.0 | 9.9 | 100.0 | 5.5 | 100.0 |
| | (A2)A2-2 | | 31.0 | | — | | — | | 31.0 | |
| | (A2)A2-2.5 | | — | | 23.1 | | 23.1 | | — | |
| | (C)C-1 | | 31.0 | 85.0 | 14.6 | 44.2 | 14.6 | 44.2 | 16.8 | 46.0 |
| | Dispersion solvent (IPA) | | 124.0 | | 58.3 | | 58.3 | | 67.2 | |
| | (D) γ-GPS | | 6.0 | 16.5 | — | | — | | 3.4 | 9.3 |
| | (D) γ-APS | | — | | 3.0 | 9.1 | 3.0 | 9.1 | — | |
| | (E)AIAA | | 0.7 | 1.9 | 0.2 | 0.6 | 0.2 | 0.6 | 0.3 | 0.8 |
| | Polymerization initiator APPI | | 2.8 | | 2.4 | | 2.4 | | 2.8 | |
| | UV absorber UV1 | | 2.7 | | 1.0 | | 1.0 | | 2.7 | |
| | HCl | | 1.4 | | 0.7 | | 0.7 | | 0.8 | |
| | Organic solvent | IPA | 6 | | 70.8 | | 70.8 | | 62.8 | |
| | | MIBK | 68.9 | | 86.0 | | 86.0 | | 86.7 | |
| | Total | | 280.0 | | 270.0 | | 270.0 | | 280.0 | |
| | Refractive index | | 1.50 | | 1.50 | | 1.50 | | 1.50 | |
| | Layer thickness | | 1.5 μm | | 1.5 μm | | 1.5 μm | | 1.5 μm | |
| Underlying layer | (A1)A1-6 | | 5.2 | 100.0 | 3.9 | 100.0 | 3.9 | 100.0 | 5.2 | 100.0 |
| | Polymerization initiator APPI | | 0.1 | | 0.1 | | 0.1 | | 0.1 | |
| | Organic solvent | IPA | 203.8 | | 204.8 | | 204.8 | | 203.8 | |
| | | SBAC | 50.9 | | 51.2 | | 51.2 | | 50.9 | |
| | Total | | 260.0 | | 260.0 | | 260.0 | | 260.0 | |
| | Refractive index | | 1.50 | | 1.50 | | 1.50 | | 1.50 | |
| | Layer thickness | | 80 nm | | 65 nm | | 65 nm | | 80 nm | |

TABLE 6

| Layer | Mixed components of coating composition | | Example 11 | | Example 12 | | Example 13 | | Example 14 | |
|---|---|---|---|---|---|---|---|---|---|---|
| | | | Mixture quantity | Parts by mass | Mixture quantity | Parts by mass | Mixture quantity | Parts by mass | Mixture quantity | Parts by mass |
| Low refractive index layer | (B)ASE | | 1.3 | 100.0 | 2.1 | 100.0 | 2.1 | 100.0 | 1.3 | 100.0 |
| | Dispersion solvent (DGLM) | | 1.2 | | 2.0 | | 2.0 | | 1.2 | |
| | (C)C-2 | | 2.6 | 200.0 | 6.5 | 309.5 | 2.6 | 123.8 | 2.6 | 200.0 |
| | Dispersion solvent (IPA) | | 10.4 | | 26.0 | | 10.4 | | 10.4 | |
| | (D) γ-GPS | | 1.6 | 123.1 | 3.5 | 166.7 | 0.6 | 28.6 | 1.6 | 123.1 |
| | (E) AIAA | | 0.1 | 7.7 | 0.3 | 14.3 | 0.1 | 4.8 | 0.1 | 7.7 |
| | HCl | | 0.4 | | 0.8 | | 0.1 | | 0.4 | |
| | Organic solvent | IPA | 121.2 | | 109.4 | | 121.0 | | 121.2 | |
| | | MIBK | 121.2 | | 109.4 | | 121.0 | | 121.2 | |
| | Total | | 260.0 | | 260.0 | | 260.0 | | 260.0 | |
| | Refractive index | | 1.28 | | 1.27 | | 1.30 | | 1.28 | |
| | Layer thickness | | 85 nm | | 85 nm | | 85 nm | | 85 nm | |
| High refractive index layer | (B)ASE | | 0.5 | 100.0 | 0.8 | 100.0 | 0.8 | 100.0 | 0.5 | 100.0 |
| | Dispersion solvent (DGLM) | | 0.5 | | 0.7 | | 0.7 | | 0.5 | |
| | (F)ZrO2(20) | | 6.5 | 1300.0 | 12.5 | 1562.5 | 6.1 | 762.5 | 6.5 | 1300.0 |
| | Dispersion solvent *1 | | 36.5 | | 70.8 | | 34.0 | | 36.5 | |
| | (D) γ-GPS | | 1.4 | 280.0 | 2.5 | 312.5 | 0.9 | 112.5 | 1.4 | 280.0 |
| | (E)AIAA | | 0.1 | 20.0 | 0.3 | 37.5 | 0.1 | 12.5 | 0.1 | 20.0 |
| | HCl | | 0.3 | | 0.6 | | 0.2 | | 0.3 | |
| | Organic solvent | Etacohol | 112.1 | | 90.9 | | 113.6 | | 112.1 | |
| | | SBAC | 112.1 | | 90.9 | | 113.6 | | 112.1 | |
| | Total | | 270.0 | | 270.0 | | 270.0 | | 270.0 | |
| | Refractive index | | 1.80 | | 1.85 | | 1.77 | | 1.80 | |
| | Layer thickness | | 70 nm | | 70 nm | | 70 nm | | 70 nm | |

TABLE 6-continued

| Layer | Mixed components of coating composition | Example 11 Mixture quantity | Parts by mass | Example 12 Mixture quantity | Parts by mass | Example 13 Mixture quantity | Parts by mass | Example 14 Mixture quantity | Parts by mass |
|---|---|---|---|---|---|---|---|---|---|
| Intermediate | (B)ASE | 3.1 | 100.0 | 6.4 | 100.0 | 6.4 | 100.0 | 3.1 | 100.0 |
| refractive | Dispersion solvent (DGLM) | 3.0 | | 6.2 | | 6.2 | | 3.0 | |
| index | (F)ZrO2(60) | 4.8 | 154.8 | 11.0 | 171.9 | 3.9 | 60.9 | 4.8 | 154.8 |
| layer | Dispersion solvent (PGM) | 4.3 | | 9.8 | | 3.4 | | 4.3 | |
| | (D) γ -GPS | 1.9 | 61.3 | 6.7 | 104.7 | 3.3 | 51.6 | 1.9 | 61.3 |
| | (E)AIAA | 0.1 | 3.2 | 0.7 | 10.9 | 0.2 | 3.1 | 0.1 | 3.2 |
| | HCl | 1.2 | | 3.0 | | 2.3 | | 1.2 | |
| | Organic   IPA | 100.3 | | 64.3 | | 73.3 | | 100.3 | |
| | solvent   SBAC | 151.3 | | 162.0 | | 171.0 | | 151.3 | |
| | Total | 270.0 | | 270.1 | | 270.0 | | 270.0 | |
| | Refractive index | 1.69 | | 1.70 | | 1.62 | | 1.69 | |
| | Layer thickness | 75 nm | | 75 nm | | 75 nm | | 75 nm | |

*1 BuOH/EtOH

Comparative Examples 1 to 5

Antireflection substrates were manufactured in the same manner as in Example 1, except that coating compositions having the compositions shown in Tables 7 and 8 were used.

In addition, a total light transmittance, reflectance, elongation percentage, abrasion resistance, and manufacturing stability of each of the antireflection substrates were measured and evaluated according to the above-described test method, and the results are shown in Table 9.

TABLE 7

| Layer | Mixed components of coating composition | Comparative Example 1 Mixture quantity | Parts by mass | Comparative Example 2 Mixture quantity | Parts by mass | Comparative Example 3 Mixture quantity | Parts by mass | Comparative Example 4 Mixture quantity | Parts by mass | Comparative Example 5 Mixture quantity | Parts by mass |
|---|---|---|---|---|---|---|---|---|---|---|---|
| Cover | (B)ASE | 0.0 | | 0.0 | | 1.8 | 100.0 | 1.8 | 100.0 | 1.8 | 100.0 |
| layer | Dispersion solvent (DGLM) | 0.0 | | 0.0 | | 1.7 | | 1.7 | | 1.7 | |
| | (D) γ -GPS | 2.4 | | 2.4 | | 0.2 | 11.1 | 0.2 | 11.1 | 0.2 | 11.1 |
| | (E)AIAA | 0.1 | | 0.1 | | 0.1 | 5.6 | 0.1 | 5.6 | 0.1 | 5.6 |
| | HCl | 0.5 | | 0.5 | | 0.5 | | 0.5 | | 0.5 | |
| | Organic   IPA | 128.5 | | 128.5 | | 127.8 | | 127.8 | | 127.8 | |
| | solvent   SBAC | 128.5 | | 128.5 | | 127.8 | | 127.8 | | 127.8 | |
| | Total | 260 | | 260.0 | | 259.9 | | 259.9 | | 259.9 | |
| | Refractive index | 1.49 | | 1.49 | | 1.49 | | 1.49 | | 1.49 | |
| | Layer thickness | 15 nm | | 15 nm | | 15 nm | | 15 nm | | 15 nm | |
| Hard | (A3)A1-6 | 9.9 | 100.0 | 9.9 | 100.0 | 9.9 | 100.0 | 9.9 | 100.0 | 9.9 | 100.0 |
| coat | (A2)A2-2 | — | | — | | — | | — | | — | |
| layer | (A2)A2-2.5 | 23.1 | | 23.1 | | 23.1 | | 23.1 | | 23.1 | |
| | (C)C-1 | 14.6 | 44.2 | 14.6 | 44.2 | 14.6 | 44.2 | 14.6 | 44.2 | 14.6 | 44.2 |
| | Dispersion solvent (IPA) | 58.3 | | 58.3 | | 58.3 | | 58.3 | | 58.3 | |
| | (D) γ -GPS | — | | — | | — | | — | | — | |
| | (D) γ -APS | 3.0 | 9.1 | 3.0 | 9.1 | 3.0 | 9.1 | 3.0 | 9.1 | 3.0 | 9.1 |
| | (E) AIAA | 0.2 | 0.6 | 0.2 | 0.6 | 0.2 | 0.6 | 0.2 | 0.6 | 0.2 | 0.6 |
| | Polymerization initiator APPI | 2.4 | | 2.4 | | 2.4 | | 2.4 | | 2.4 | |
| | UV absorber UV1 | 1.0 | | 1.0 | | 1.0 | | 1.0 | | 1.0 | |
| | HCl | 0.7 | | 0.7 | | 0.7 | | 0.7 | | 0.7 | |
| | Organic   IPA | 70.8 | | 70.8 | | 70.8 | | 70.8 | | 70.8 | |
| | solvent   MIBK | 85.0 | | 86.0 | | 86.0 | | 86.0 | | 86.0 | |
| | Total | 269.0 | | 270.0 | | 270.0 | | 270.0 | | 270.0 | |
| | Refractive index | 1.50 | | 1.50 | | 1.50 | | 1.50 | | 1.50 | |
| | Layer thickness | 1.5 μm | | 1.5 μm | | 1.5 μm | | 1.5 μm | | 1.5 μm | |
| Under- | (A1)A1-6 | 3.9 | 100.0 | 3.9 | 100.0 | 3.9 | 100.0 | 3.9 | 100.0 | 3.9 | 100.0 |
| lying | Polymerization initiator APPI | 0.1 | | 0.1 | | 0.1 | | 0.1 | | 0.1 | |
| layer | Organic   IPA | 204.8 | | 204.8 | | 204.8 | | 204.8 | | 204.8 | |
| | solvent   SBAC | 51.2 | | 51.2 | | 51.2 | | 51.2 | | 51.2 | |
| | Total | 260.0 | | 260.0 | | 260.0 | | 260.0 | | 260.0 | |
| | Refractive index | 1.50 | | 1.50 | | 1.50 | | 1.50 | | 1.50 | |
| | Layer thickness | 65 nm | | 65 nm | | 65 nm | | 65 nm | | 65 nm | |

TABLE 8

| Layer | Mixed components of coating composition | | Comparative Example 1 | | Comparative Example 2 | | Comparative Example 3 | | Comparative Example 4 | | Comparative Example 5 | |
|---|---|---|---|---|---|---|---|---|---|---|---|---|
| | | | Mixture quantity | Parts by mass | Mixture quantity | Parts by mass | Mixture quantity | Parts by mass | Mixture quantity | Parts by mass | Mixture quantity | Parts by mass |
| Low refractive index layer | (B)ASE | | 0.0 | | 2.1 | 100.0 | 0.0 | | 2.1 | 100.0 | 2.1 | 100.0 |
| | Dispersion solvent (DGLM) | | 0.0 | | 2.0 | | 0.0 | | 2.0 | | 2.0 | |
| | (C)C-2 | | 2.6 | | 2.6 | 123.8 | 2.6 | | 2.6 | 123.8 | 2.6 | 123.8 |
| | Dispersion solvent (IPA) | | 10.4 | | 10.4 | | 10.4 | | 10.4 | | 10.4 | |
| | (D) γ -GPS | | 3.2 | | 0.6 | 28.6 | 3.2 | | 0.6 | 28.6 | 0.6 | 28.6 |
| | (E) AIAA | | 0.1 | | 0.1 | 4.8 | 0.1 | | 0.1 | 4.8 | 0.1 | 4.8 |
| | HCl | | 0.7 | | 0.1 | | 0.7 | | 0.1 | | 0.1 | |
| | Organic solvent | IPA | 121.5 | | 121.0 | | 121.5 | | 121.0 | | 121.0 | |
| | | MIBK | 121.5 | | 121.0 | | 121.5 | | 121.0 | | 121.0 | |
| | Total | | 260.0 | | 260.0 | | 260.0 | | 260.0 | | 260.0 | |
| | Refractive index | | 1.30 | | 1.30 | | 1.30 | | 1.30 | | 1.30 | |
| | Layer thickness | | 85 nm | | 85 nm | | 85 nm | | 85 nm | | 85 nm | |
| High refractive index layer | (B)ASE | | 0.0 | | 0.8 | 100.0 | 0.8 | 100.0 | 0.0 | | 0.8 | 100.0 |
| | Dispersion solvent (DGLM) | | 0.0 | | 0.7 | | 0.7 | | 0.0 | | 0.7 | |
| | (F)ZrO2(20) | | 6.1 | | 6.1 | 762.5 | 6.1 | 762.5 | 6.1 | | 6.1 | 762.5 |
| | Dispersion solvent *1 | | 34.0 | | 34.0 | | 34.0 | | 34.0 | | 34.0 | |
| | (D) γ -GPS | | 1.8 | | 0.9 | 112.5 | 0.9 | 112.5 | 1.8 | | 0.9 | 112.5 |
| | (E) AIAA | | 0.1 | | 0.1 | 12.5 | 0.1 | 12.5 | 0.1 | | 0.1 | 12.5 |
| | HCl | | 0.4 | | 0.2 | | 0.2 | | 0.4 | | 0.2 | |
| | Organic solvent | Etacohol | 113.8 | | 113.6 | | 113.6 | | 113.8 | | 113.6 | |
| | | SBAC | 113.8 | | 113.6 | | 113.6 | | 113.8 | | 113.6 | |
| | Total | | 270.0 | | 270.0 | | 270.0 | | 270.0 | | 270.0 | |
| | Refractive index | | 1.77 | | 1.77 | | 1.77 | | 1.77 | | 1.77 | |
| | Layer thickness | | 70 nm | | 70 nm | | 70 nm | | 70 nm | | 70 nm | |
| Inter-mediate refractive index layer | (B)ASE | | 0.0 | | 6.4 | 100.0 | 6.4 | 100.0 | 6.4 | 100.0 | 0.0 | |
| | Dispersion solvent (DGLM) | | 0.0 | | 6.2 | | 6.2 | | 6.2 | | 0.0 | |
| | (F)ZrO2(60) | | 3.9 | | 3.9 | 60.9 | 3.9 | 60.9 | 3.9 | 60.9 | 3.9 | |
| | Dispersion solvent (PGM) | | 3.4 | | 3.4 | | 3.4 | | 3.4 | | 3.4 | |
| | (D) γ -GPS | | 11.0 | | 3.3 | 51.6 | 3.3 | 51.6 | 3.3 | 51.6 | 11.0 | |
| | (E) AIAA | | 0.2 | | 0.2 | 3.1 | 0.2 | 3.1 | 0.2 | 3.1 | 0.2 | |
| | HCl | | 2.5 | | 2.3 | | 2.3 | | 2.3 | | 2.5 | |
| | Organic solvent | IPA | 74.7 | | 73.3 | | 73.3 | | 73.3 | | 74.7 | |
| | | SBAC | 174.3 | | 171.0 | | 171.0 | | 171.0 | | 174.3 | |
| | Total | | 270.0 | | 270.0 | | 270.0 | | 270.0 | | 270.0 | |
| | Refractive index | | 1.62 | | 1.62 | | 1.62 | | 1.62 | | 1.62 | |
| | Layer thickness | | 75 nm | | 75 nm | | 75 nm | | 75 nm | | 75 nm | |

*1 BuOH/EtOH

TABLE 9

| | Optical characteristics | | | | Manufacturing stability | |
|---|---|---|---|---|---|---|
| | Total light transmittance | Reflectance | Elongation percentage | Abrasion resistance | Coating stability | Elongation stability |
| Example 1 | 94.30% | 0.70% | 130% | ◎ | 10 | 10 |
| Example 2 | 94.20% | 0.80% | 150% | ◎ | 10 | 10 |
| Example 3 | 94.20% | 0.80% | 160% | ○ | 10 | 10 |
| Example 4 | 94.20% | 0.80% | 140% | ◎ | 10 | 10 |
| Example 5 | 94.00% | 1.00% | 150% | ◎ | 10 | 10 |
| Example 6 | 94.50% | 0.50% | 140% | ○ | 10 | 10 |
| Example 7 | 94.20% | 0.80% | 150% | ○ | 10 | 10 |
| Example 8 | 94.25% | 0.75% | 145% | ◎ | 10 | 10 |
| Example 9 | 94.20% | 0.80% | 110% | ◎ | 10 | 8 |
| Example 10 | 94.20% | 0.80% | 110% | Δ | 10 | 10 |
| Example 11 | 94.20% | 0.80% | 110% | ○ | 10 | 8 |
| Example 12 | 94.60% | 0.40% | 135% | Δ | 10 | 9 |
| Example 13 | 94.20% | 0.80% | 110% | Δ | 10 | 10 |
| Example 14 | 94.25% | 0.75% | 110% | ○ | 10 | 10 |
| Comparative Example 1 | 94.20% | 0.80% | 110% | ◎ | 1 | 1 |
| Comparative Example 2 | 94.20% | 0.80% | 110% | ◎ | 2 | 2 |
| Comparative Example 3 | 94.20% | 0.80% | 110% | ◎ | 2 | 1 |

TABLE 9-continued

| | Optical characteristics | | | | Manufacturing stability | |
| | Total light transmittance | Reflectance | Elongation percentage | Abrasion resistance | Coating stability | Elongation stability |
| --- | --- | --- | --- | --- | --- | --- |
| Comparative Example 4 | 94.20% | 0.80% | 110% | ◎ | 2 | 1 |
| Comparative Example 5 | 94.20% | 0.80% | 110% | ◎ | 2 | 1 |

Comparative Example 1 is an example in which the organic/inorganic composite compound (B), which is a feature of the present invention, is not contained in all layers of the antireflection layer and the cover layer. In Comparative Example 1, a total light transmittance, reflectance, elongation percentage, and abrasion resistance were the same as those of the antireflection substrate of the present invention, but both coating stability and elongation stability were extremely poor. Abrasion resistance was excellent.

Comparative Example 2 is an example in which the organic/inorganic composite compound (B), which is a feature of the present invention, is not contained in the cover layer. In Comparative Example 2, a total light transmittance, reflectance, elongation percentage, and abrasion resistance were the same as those of the antireflection substrate of the present invention, but both coating stability and elongation stability were not sufficient. Abrasion resistance was excellent.

Comparative Example 3 is an example in which the organic/inorganic composite compound (B), which is a feature of the present invention, is not contained in the low refractive index layer. In Comparative Example 3, a total light transmittance, reflectance, elongation percentage, and abrasion resistance were the same as those of the antireflection substrate of the present invention. However, coating stability was not sufficient, and elongation stability was particularly poor. Abrasion resistance was excellent.

Comparative Example 4 is an example in which the organic/inorganic composite compound (B), which is a feature of the present invention, is not contained in the high refractive index layer. In Comparative Example 4, a total light transmittance, reflectance, elongation percentage, and abrasion resistance were the same as those of the antireflection substrate of the present invention. However, coating stability was not sufficient, and elongation stability was particularly poor. Abrasion resistance was excellent.

Comparative Example 5 is an example in which the organic/inorganic composite compound (B), which is a feature of the present invention, is not contained in the intermediate refractive index layer. In Comparative Example 5, a total light transmittance, reflectance, elongation percentage, and abrasion resistance were the same as those of the antireflection substrate of the present invention. However, coating stability was not sufficient, and elongation stability was particularly poor. Abrasion resistance was excellent.

From the comparative examples, it can be understood that, when the organic/inorganic composite compound (B), which is a feature of the present invention, is not used in at least one of the antireflection layers or the cover layer, both coating stability and elongation stability are not sufficient, and a high-performance antireflection substrate cannot be stably manufactured.

The invention claimed is:

1. An antireflection substrate which has a predetermined elongation percentage of 120% to 160%, comprising:
   a resin substrate; and
   an underlying layer, a hard coat layer, an antireflection layer, and a cover layer which are provided on the resin substrate in this order, wherein the underlying layer is formed of a cured material of a hexafunctional or higher functional urethane (meth)acrylate compound (A1), the hard coat layer contains a cured material of a urethane (meth)acrylate compound (A) containing 60% by mass or more of a trifunctional or less functional urethane (meth)acrylate compound (A2), the antireflection layer includes an intermediate refractive index layer having a refractive index of 1.50 to 1.75, a high refractive index layer having a refractive index of 1.60 to 2.00, and a low refractive index layer having a refractive index of 1.25 to 1.40 in this order from the hard coat layer side, the refractive index of the high refractive index layer being higher than that of the intermediate refractive index layer, and the intermediate refractive index layer, the high refractive index layer, and the low refractive index layer all contain a cured material of an organic/inorganic composite compound (B), the cover layer includes a cured material of the organic/inorganic composite compound (B), and the organic/inorganic composite compound (B) is a composite compound having a structure in which an alkoxysilyl group is bonded to any of a bisphenol A-type epoxy resin, a novolac phenol resin, and a polyamic acid.

2. The antireflection substrate according to claim 1, wherein the hard coat layer is formed of a cured material of a composition containing 30 to 80 parts by mass of spherical silica particles (C-1), 5 to 15 parts by mass of a silane coupling agent (D), and 0.1 to 1.5 parts by mass of a metal chelate compound (E) with respect to 100 parts by mass of the urethane (meth)acrylate compound (A) containing 60% by mass or more of a trifunctional or less functional urethane (meth)acrylate compound (A2), the intermediate refractive index layer is formed of a cured material of a composition containing 50 to 170 parts by mass of metal oxide particles (F), 50 to 100 parts by mass of a silane coupling agent (D), and 1 to 10 parts by mass of a metal chelate compound (E) with respect to 100 parts by mass of the organic/inorganic composite compound (B), the high refractive index layer is formed of a cured material of a composition containing 500 to 1500 parts by mass of metal oxide particles (F), 100 to 300 parts by mass of a silane coupling agent (D), and 10 to 30 parts by mass of a metal chelate compound (E) with respect to 100 parts by mass of the organic/inorganic composite compound (B), the low refractive index layer is formed of a cured material of a composition containing 100 to 300 parts by mass of hollow silica particles (C-2), 20 to 150 parts by mass of a silane coupling agent (D), and 1 to 10 parts by mass of a metal chelate compound (E) with respect to 100 parts by mass of the organic/inorganic composite compound (B), and the cover layer is formed of a cured material of a composition containing 10 to 80 parts by mass of a silane coupling agent (D) and 1 to 10 parts by mass of a metal chelate compound (E) with respect to 100 parts by mass of the organic/inorganic composite compound (B).

3. The antireflection substrate according to claim 1, wherein the underlying layer has a thickness of 20 nm to 150 nm, the hard coat layer has a thickness of 1 μm to 5 μm, the intermediate refractive index layer has a thickness of 50 nm to 200 nm, the high refractive index layer has a thickness of 50 nm to 200 nm, the low refractive index layer has a thickness of 50 nm to 200 nm, and the cover layer has a thickness of 10 nm to 20 nm.

4. An antireflection film for film insert molding comprising the antireflection substrate according to claim 1.

\* \* \* \* \*